United States Patent
Reddy et al.

(10) Patent No.: US 9,894,665 B2
(45) Date of Patent: Feb. 13, 2018

(54) SOFT ACCESS POINT BACKEND DATA CONNECTION SPEED WITHIN A WI-FI BEACON

(71) Applicant: QUALCOMM Incorporated, San Diego, CA (US)

(72) Inventors: Jagadishwara Reddy, Hyderabad (IN); Shveta Patil, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/755,194

(22) Filed: Jun. 30, 2015

(65) Prior Publication Data

US 2017/0006614 A1   Jan. 5, 2017

(51) Int. Cl.
| | |
|---|---|
| *H04W 4/00* | (2009.01) |
| *H04W 72/08* | (2009.01) |
| *H04W 48/10* | (2009.01) |
| *H04W 48/16* | (2009.01) |
| *H04W 48/00* | (2009.01) |
| *H04W 40/24* | (2009.01) |
| *H04W 48/20* | (2009.01) |
| *H04W 72/04* | (2009.01) |

(52) U.S. Cl.
CPC ......... *H04W 72/085* (2013.01); *H04W 40/24* (2013.01); *H04W 48/10* (2013.01); *H04W 48/16* (2013.01); *H04W 48/17* (2013.01); *H04W 48/20* (2013.01); *H04W 72/046* (2013.01)

(58) Field of Classification Search
None
See application file for complete search history.

(56) References Cited

U.S. PATENT DOCUMENTS

| 7,639,637 B2 | 12/2009 | Honjo et al. |
| 8,427,942 B2 | 4/2013 | Kim et al. |
| 8,751,648 B2 | 6/2014 | Scherzer et al. |

(Continued)

FOREIGN PATENT DOCUMENTS

WO    WO-2010140742 A1    12/2010

OTHER PUBLICATIONS

ISA/EP, International Search Report and Written Opinion of the International Searching Authority, Int'l App. No. PCT/US2016/033887, Aug. 3, 2016, European Patent Office, Rijswijk, NL, 14 pgs.

(Continued)

*Primary Examiner* — Jutai Kao
(74) *Attorney, Agent, or Firm* — Holland & Hart LLP

(57) ABSTRACT

Methods, systems, and devices are described for wireless communication. A station (STA) may be in the coverage area of a number of access points (APs). The STA may select an AP based on signal strength for each available AP. However, using only signal strength for selecting an AP may be insufficient, such as if an AP is a soft AP and may be connected to a number of different networks. As such an AP may transmit network information to the STA. The STA may request the network information through a probe request. The network information may be transmitted to the STA as a beacon or a probe response. The STA may use the network information in addition to the signal strength when determining an AP to select. An AP may transmit network information if a change in network conditions is detected.

32 Claims, 18 Drawing Sheets

(56) References Cited

U.S. PATENT DOCUMENTS

| | | |
|---|---|---|
| 2007/0060105 A1 | 3/2007 | Batta |
| 2008/0102852 A1 | 5/2008 | Du et al. |
| 2008/0176571 A1 | 7/2008 | Choi |
| 2008/0316982 A1 | 12/2008 | Murty et al. |
| 2014/0106827 A1* | 4/2014 | Lim ..................... G06F 9/00 455/574 |
| 2014/0362776 A1 | 12/2014 | Tian et al. |
| 2015/0098392 A1 | 4/2015 | Homchaudhuri et al. |
| 2015/0282053 A1* | 10/2015 | Kneckt ............... H04W 48/16 370/329 |
| 2016/0278007 A1* | 9/2016 | Gokhale ............. H04W 48/20 |
| 2017/0164275 A1* | 6/2017 | Wang .................. H04W 48/16 |

OTHER PUBLICATIONS

IPEA/EP, Second Written Opinion of the International Preliminary Examining Authority, Int'l Application No. PCT/U520/6/033887, May 26, 2017, European Patent Office, Munich, DE, 9 pgs.

\* cited by examiner

SOFT ACCESS POINT BACKEND DATA CONNECTION SPEED WITHIN A WI-FI BEACON

BACKGROUND

The following relates generally to wireless communication, and more specifically to soft access point (AP) backend data connection speed within a Wi-Fi beacon.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., IEEE 802.11) network may include an AP that may communicate with at least one station (STA) or mobile device. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

At times, numerous APs may be available for use by a STA. The STA may select an AP based on information or input received, such as from a user. A STA may present information to the user, which allows the user to select an AP for use. Signal strength for a number of APs may be displayed to the user. The signal strength for each AP may be determined based on a determined distance between the STA and the AP. The distance between the STA and the AP, however, may be insufficient information to make the determination as to which AP to use.

SUMMARY

The station (STA) may determine a signal strength for communications with a number of access points (APs), such that the number of APs includes a soft AP. The STA may receive a throughput indication from the number of APs. The STA may select an AP from the number of APs based on the signal strength and the throughput indication. The STA may establish a connection for communication with the selected AP. In some examples selecting the AP from the number of APs includes displaying connection information relating to a set of the number of APs, such that the connection information includes the signal strength and the throughput indication. The STA may receive user input indicating a selection of the AP from the number of APs.

The AP may determine a first throughput indication relating to a first throughput of a first network connection. The AP may transmit a first message including the first throughput indication. In some examples identifying network information includes receiving, at a modem of the AP, a network request. The AP may transmit, from the modem of the soft AP, the network information, such that the network information may be responsive to the network request. The AP may determine a change in network conditions and may determine a second throughput indication based on the new network conditions. The AP may transmit a second message including the second throughput indication.

A method of wireless communication is described. The method may include determining, at a station (STA), a signal strength for communications with a number of access points (APs), wherein the number of APs comprises a soft AP, receiving a throughput indication from the number of APs, and selecting an AP from the number of APs based at least in part on the signal strength and the throughput indication.

An apparatus for wireless communication is described. The apparatus may include a signal strength determiner for determining, at a station (STA), a signal strength for communications with a number of access points (APs), wherein the number of APs comprises a soft AP, a throughput transceiver for receiving a throughput indication from the number of APs, and an access point selector for selecting an AP from the number of APs based at least in part on the signal strength and the throughput indication.

A further apparatus for wireless communication is described. The apparatus may include a processor, memory in electronic communication with the processor, and instructions stored in the memory and operable, when executed by the processor, to cause the apparatus to determine, at a station (STA), a signal strength for communications with a number of access points (APs), wherein the number of APs comprises a soft AP, receive a throughput indication from the number of APs, and select an AP from the number of APs based at least in part on the signal strength and the throughput indication.

A non-transitory computer-readable medium storing code for wireless communication is described. The code may include instructions executable to determine, at a station (STA), a signal strength for communications with a number of access points (APs), wherein the number of APs comprises a soft AP, receive a throughput indication from the number of APs, and select an AP from the number of APs based at least in part on the signal strength and the throughput indication.

Some examples of the method, apparatuses, or non-transitory computer-readable medium described herein may further include processes, features, means, or instructions for establishing a connection for communication with the selected AP. Additionally or alternatively, in some examples receiving the throughput indication comprises receiving a beacon from the number of APs, wherein the beacon comprises the throughput indication.

In some examples of the method, apparatuses, or non-transitory computer-readable medium described herein, receiving the throughput indication comprises transmitting a probe request to the number of APs, and receiving a probe response from the number of APs, wherein the probe response comprises the throughput indication. Additionally or alternatively, in some examples selecting the AP from the number of APs comprises displaying connection information relating to a plurality of the number of APs, wherein the connection information comprises the signal strength and the throughput indication, and receiving user input indicating a selection of the AP from the number of APs.

Some examples of the method, apparatuses, or non-transitory computer-readable medium described herein may further include processes, features, means, or instructions for receiving an updated throughput indication from the soft AP. Additionally or alternatively, some examples may include processes, features, means, or instructions for selecting the soft AP from the number of APs based at least in part on the updated throughput indication and the signal strength.

A method of wireless communication is described. The method may include determining, at a soft access point (AP), a first throughput indication relating to a first throughput of a first network connection, and transmitting a first message comprising the first throughput indication.

An apparatus for wireless communication is described. The apparatus may include a throughput determiner for determining, at a soft access point (AP), a first throughput indication relating to a first throughput of a first network connection, and an AP throughput transceiver for transmitting a first message comprising the first throughput indication.

A further apparatus for wireless communication is described. The apparatus may include a processor, memory in electronic communication with the processor, and instructions stored in the memory and operable, when executed by the processor, to cause the apparatus to determine, at a soft access point (AP), a first throughput indication relating to a first throughput of a first network connection, and transmit a first message comprising the first throughput indication.

A non-transitory computer-readable medium storing code for wireless communication is described. The code may include instructions executable to determine, at a soft access point (AP), a first throughput indication relating to a first throughput of a first network connection, and transmit a first message comprising the first throughput indication.

In some examples of the method, apparatuses, or non-transitory computer-readable medium described herein, transmitting the first message comprises broadcasting the first message comprising the first throughput indication. Additionally or alternatively, in some examples transmitting the first message comprises receiving a probe request from a station (STA), and transmitting the first message comprising the first throughput indication to the STA, wherein the first message is responsive to the probe request.

In some examples of the method, apparatuses, or non-transitory computer-readable medium described herein, determining the first throughput indication comprises identifying network information relating to the first network connection, and determining the first throughput indication based at least in part on the network information. Additionally or alternatively, in some examples identifying network information comprises transmitting a network request to a modem of the soft AP, and receiving, from the modem of the soft AP, the network information, wherein the network information is responsive to the network request.

In some examples of the method, apparatuses, or non-transitory computer-readable medium described herein, identifying network information comprises receiving, at a modem of the soft AP, a network request, and transmitting, from the modem of the soft AP, the network information, wherein the network information is responsive to the network request. Additionally or alternatively, some examples may include processes, features, means, or instructions for determining, at the soft AP, a second throughput indication relating to a second throughput of a second network connection.

Some examples of the method, apparatuses, or non-transitory computer-readable medium described herein may further include processes, features, means, or instructions for identifying a network transition from the first network connection to the second network connection. Additionally or alternatively, some examples may include processes, features, means, or instructions for transmitting a second message comprising the second throughput indication.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
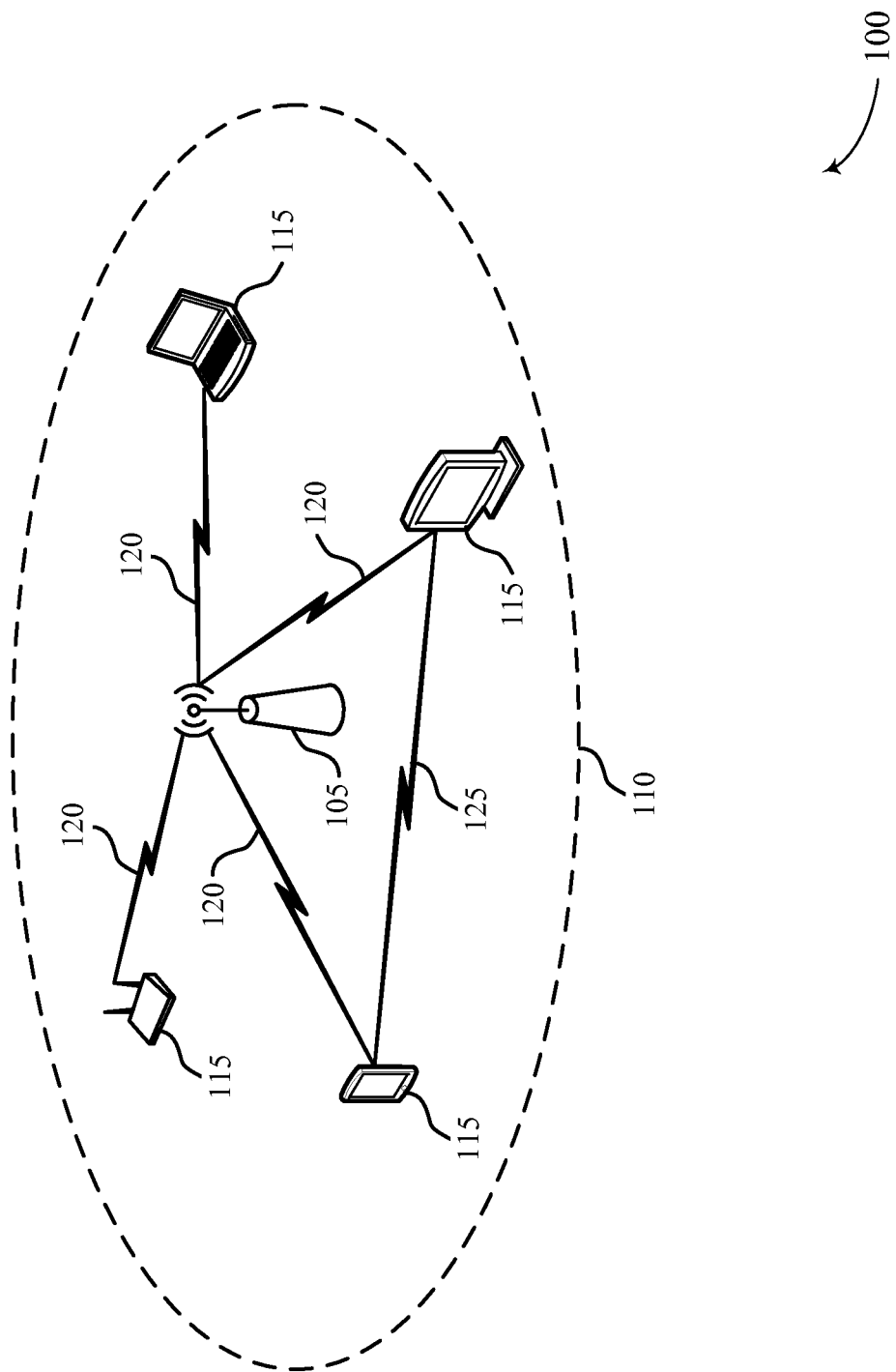
FIG. 1 illustrates a wireless local area network (WLAN) (also known as a wireless fidelity (Wi-Fi) network) for soft access point (AP) backend data connection speed within a Wi-Fi beacon, in accordance with various aspects of the present disclosure

A station (STA) may be in the coverage area of a number of access points (APs). Similarly, a number of APs may be able to provide service to a STA. APs may include software enabled access points (soft APs) which may be STAs or other mobile devices which provide service, similar to a relay, for example. While signal strength for each AP may be helpful, more information may be beneficial when selecting an AP. At times, APs may be connected to a core network by different communication technologies. As such, back-haul network information may be helpful in selecting an AP. For example, a first AP may be on a 3G network (i.e., connected on a back-haul link to a 3G network) while a second AP may be on a Long Term Evolution (LTE) network (i.e., connected on a back-haul link to an LTE network). In some cases, the first AP may be slightly closer to the STA than the second AP, and may therefore have a higher signal strength. The STA may present the first AP to the user as a preferred network (e.g., at the top of a list of all available APs, with a higher signal strength, etc.) because of a relatively higher signal strength when compared to the second AP. However, the second AP may have higher throughput than the first AP since the second AP has a higher throughput back-haul. Based on signal strength alone, it may appear to the user or STA as though the first AP is the preferred AP or strongest AP. As such, the assumption that signal strength may be proportional to data throughput may be misleading.

An AP may include additional information when transmitting a beacon or a probe response. For example, the AP may transmit information relating to a back-end, or back-haul connection, source for the AP. In some examples, the AP may be a soft AP and may already have the information relating to the back-end connection, as such the same may be transmitted in a probe response beacon. The STA may display information relating to the back-end source for the AP, such as when presenting available APs. The STA or user may select an AP based on signal strength or an indication of throughput, such as the back-end source. For example, a user may select the second AP if the signal strength is similar, but it is indicated that the first AP uses a 3G network and the second AP uses an LTE network, or it is indicated that the second AP has a higher throughput than the first AP.

Further, an AP may establish a connection between modem hardware and transmitting hardware. For example, a communication channel or a synchronization channel may be present between an AP's modem hardware and the AP's transmitting hardware. As such, the AP may accurately and seamlessly include information relating to the AP's throughput or network connection. At times, an AP may move to a different location, or for another reason, may transition between networks, such as 2G networks, 3G networks, LTE networks, etc. By establishing a connection between modem hardware and transmitting hardware the AP may accurately transmit information in a beacon or probe response relating to the AP's throughput or network connection.

Aspects of the disclosure are initially described in the context of a wireless communication system. Specific examples are then described for a STA and an AP. These and other aspects of the disclosure are further illustrated by and described with reference to apparatus diagrams, system diagrams, and flowcharts that relate to soft AP backend data connection speed within a Wi-Fi beacon.

FIG. 1 illustrates a wireless local area network (WLAN) 100 (also known as a wireless fidelity (Wi-Fi) network), in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a Basic Service Set (BSS) or an Extended Service Set (ESS). The various STAs 115 in the network are able to communicate with one another through the AP 105. Also shown is a coverage area 110 of the AP 105, which may represent a Basic Service Area (BSA) of the WLAN 100. An extended network station (not shown) associated with the WLAN 100 may be connected to a wired or wireless distribution system (DS) that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

An AP 105 may periodically transmit a frame known as a beacon that may contain information related to the network. For example, the beacon may contain a timestamp for synchronization, an interval indicating the periodicity of the beacon (and thus the target beacon transmission time (TBTT)), information related to the capabilities of the network, a service set identifier (SSID), supported rates, frequency hopping parameters, direct-sequence parameters, contention-free access parameters, independent BSS (IBSS) parameters, and a traffic indication map (TIM). A TIM may indicate to client STAs 115 whether the AP 105 has buffered frames waiting for them. In some cases, the beacon may also contain a delivery traffic indication message (DTIM), which may inform client STAs 115 about pending broadcast or multicast transmissions. After a TIM or a DTIM, the AP 105 may transmit the indicated data using carrier sense multiple access with collision avoidance (CSMA/CA). In some cases, STAs 115 may enter a sleep mode between beacon transmissions to conserve power.

An AP 105 may transmit information relating to a network connection or network condition to a STA 115. The STA 115 may use the information when selecting an AP 105 with which to establish a connection. The STA 115 may additionally use a determined signal strength with a number of APs 105 when determining an AP 105 to select. The STA 115 may request the information from the AP 105. At times, the AP 105 may be a soft AP which may have variable network connections or network conditions. By using network information in addition to a signal strength when selecting an AP 105, a STA 115 may establish a connection with an AP 105 which meets the STA's 115 preferred network conditions.

Figure 2A:
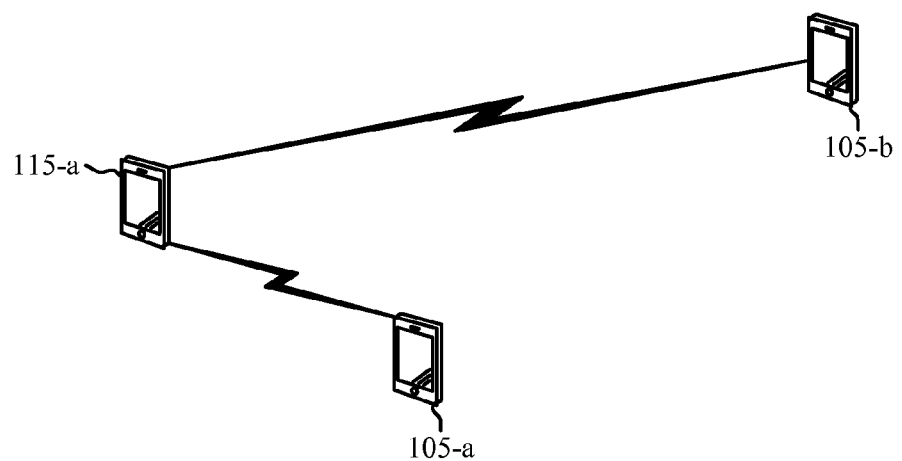
FIGS. 2A-2B illustrate examples of a wireless communications subsystem that supports soft AP backend data connection speed within a Wi-Fi beacon, in accordance with various aspects of the present disclosure.
Figure 2B:
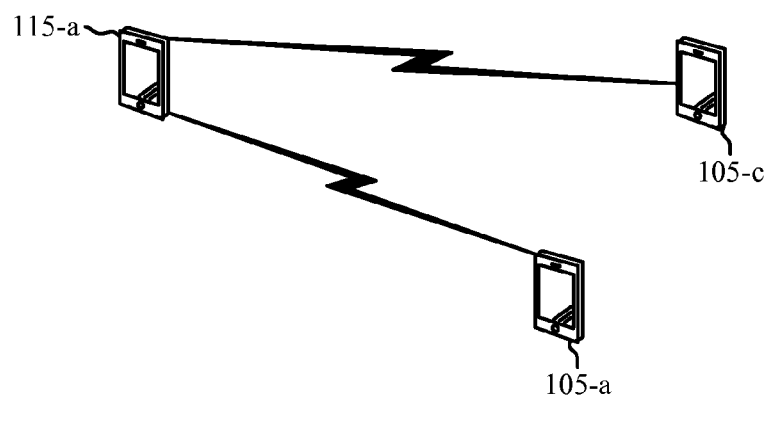

FIGS. 2A and 2B illustrate examples of wireless communications subsystems 200-a and 200-b for soft AP backend data connection speed within a Wi-Fi beacon, in accordance with various aspects of the present disclosure. Wireless communications subsystems 200-a and 200-b may include STA 115-a and APs 105-a, 105-b, or 105-c which may be examples of a STA 115 or AP 105 described with reference to FIG. 1.

A STA, such as STA 115-a, may be in the coverage area of a number of APs, such as AP 105-a, AP 105-b, and AP 105-c. Similarly, a number of APs 105 may be able to provide service to a STA 115. APs 105 may include software enabled access points (soft APs) which may be STAs 115 or other mobile devices which provide service, similar to a relay, for example. Soft APs may include devices, such as mobile devices, which are permanently or temporarily acting as a hotspot. As used herein, an AP 105 may be interchangeable with a soft AP.

At times, a STA 115 may select an AP 105 based on a signal strength, such as a received signal strength indication (RSSI), for communications with the AP 105. For example, in FIGS. 2A and 2B, STA 115-a may select AP 105-a. In FIG. 2A, the STA 115-a may select AP 105-a which may be much closer to the STA 115-a and therefore have a much higher signal strength. In FIG. 2B, the STA 115-a may select AP 105-a which may be slightly closer to the STA 115-a and therefore have a slightly higher signal strength. However, while signal strength for each AP 105 may be helpful, more information may be beneficial when selecting an AP 105. Specifically, a soft AP may be mobile which may mitigate minor signal strength differences as illustrated in FIG. 2B. Further, APs 105 may be connected to a core network by different communication technologies. An AP's 105 connection to a core network may affect a number of communication parameters such as a throughput of the connection, a load level, a delay, a bandwidth, communication capabilities, etc. As such, back-haul network information may be helpful in selecting an AP 105.

For example, a first AP 105-a may be on a 3G network (i.e., connected on a back-haul link to a 3G network) while a second AP 105-c may be on a Long Term Evolution (LTE) network (i.e., connected on a back-haul link to an LTE network). In some cases, such as illustrated in FIG. 2B, the first AP 105-a may be slightly closer to the STA 115-a than the second AP 105-c, and may therefore have a higher signal strength. The STA 115-a may present the first AP 105-a to the user as a preferred network (e.g., at the top of a list of all available APs 105, with a higher signal strength, etc.) because of a relatively higher signal strength when compared to the second AP 105-c. Further, the STA 115-a may autonomously select the first AP 105-a for connection. However, the second AP 105-c may have other preferred connection characteristics. For example, the second AP 105-c may have higher throughput than the first AP 105-a since the second AP 105-c has a higher throughput back-haul. Based on signal strength alone, it may appear to the user or STA 115-a as though the first AP 105-a is the preferred AP 105 or strongest AP 105. As such, the assumption that signal strength may be proportional to data throughput, or other connection characteristics, may be misleading.

Often, APs 105 advertise their presence by sending out beacons, such as beacon frames, which may include information related to the AP 105 such as a service set identifier (SSID) or a basic service set identifier (BSSID). In some cases, such as prior to association, STAs 115 may gather information about the APs 105 by scanning the channels through passive scanning or active scanning.

As an example of passive scanning, the STA 115 may tune the radio to each channel and listen for beacons transmitted by APs 105 on the channel. As a further example, the STA 115 may listen for beacons containing an SSID that it may have connected to in the past. In some cases, if the STA 115 receives beacons from multiple APs 105 for the same SSID, it may attempt to connect to the AP 105 with a preferred RSSI.

As an example of active scanning, the STA 115 may transmit probe request frames, such as on each channel. The probe requests may be received by APs 105, and may trigger the APs 105 to transmit information about themselves. An AP 105 may respond to a probe request with probe response frames. A probe response frame may include similar information to a beacon frame. For example, the APs 105 operating on a channel may respond to a probe request with a probe response which may include an SSID, supported rates, or security rates for the AP 105.

An AP 105 may include additional information when transmitting a beacon or a probe response. For example, the AP 105 may transmit information relating to a back-end, or back-haul connection, source for the AP 105. In some examples, the AP 105 may be a soft AP and may already have the information relating to the back-end connection, as such the same may be transmitted in a probe response beacon. The STA 115 may display information relating to the back-end source for the AP 105, such as when presenting available APs 105. The STA 115 or user may select an AP 105 based on signal strength or an indication of throughput, such as the back-end source, or a combination thereof. For example, a user may select the second AP 105-c if the signal strength is similar, but it is indicated that the first AP 105-a uses a 3G network and the second AP 105-c uses an LTE network, or it is indicated that the second AP 105-c has a higher throughput than the first AP 105-a. In FIG. 2A, a user, or the STA 115-a, may still select AP 105-a, as the higher signal strength may outweigh a potentially higher throughput of AP 105-b. However, AP 105-b may have more communication capabilities (e.g., voice over internet protocol (VoIP)) or a high enough throughput advantage when compared to AP 105-a, to justify selecting AP 105-b over AP 105-a.

Selecting an AP 105 may include presenting a number of available APs 105 to a user of a STA 115 and waiting for user input on which AP 105 to select, or a STA 115 may determine, in some cases without user input, an appropriate AP 105 to select. The STA 115 may determine an appropriate AP 105 to select based on weighting different parameters. For example, a signal strength as well as other network conditions, such as a throughput may be assigned scalar values. A sum of the product of the scalar values and the network condition values may provide a numerical means of selecting an appropriate AP 105. The scalar values may be predefined, determined in real-time, determined in quasi-real-time, or determined dynamically. Further, a STA 115 may dynamically connect or reconnect to another AP 105, such as based on more preferred conditions.

Figure 3:
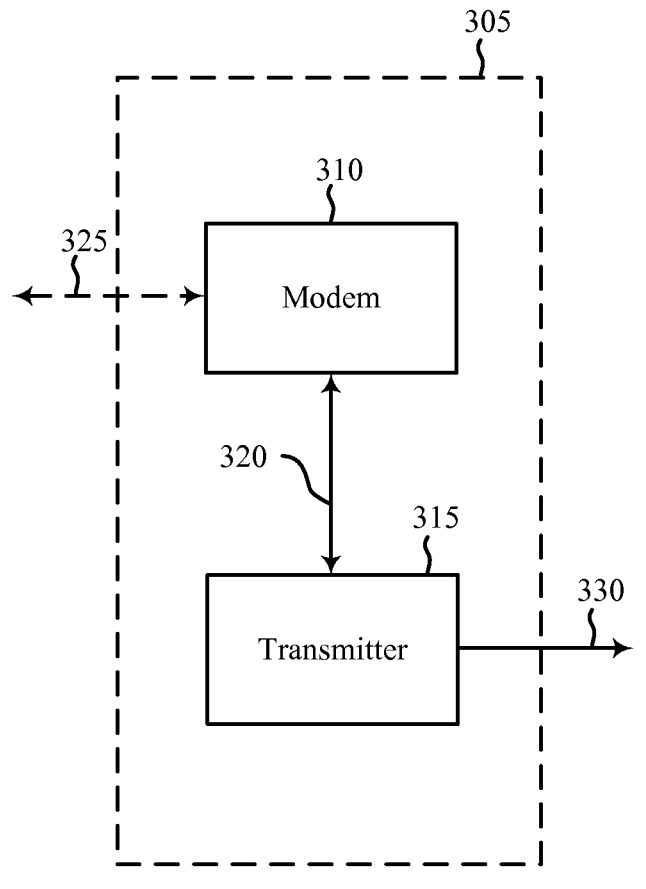
FIG. 3 illustrates a block diagram of a wireless device that supports soft AP backend data connection speed within a Wi-Fi beacon, in accordance with various aspects of the present disclosure.

FIG. 3 illustrates an example of a block diagram 300 of a wireless device 305 for soft AP backend data connection speed within a Wi-Fi beacon, in accordance with various aspects of the present disclosure. Wireless device 305 may be a STA 115 or AP 105, which may be examples of a STA 115 or AP 105 described with reference to FIGS. 1-2B. In some cases, wireless device 305 may be a soft AP.

A mobile device 305 may include a modem 310 and a transmitter 315. The modem 310 may modulate or demodulate signals to encode or decode information. The transmitter 315 may transmit signals, such as signals modulated by the modem 310. The transmitter 315 may be a transceiver combining transmitting and receiving capabilities. At times, the modem 310 or transmitter 315 may be hardware. The mobile device 305 may establish a communication channel 320 between modem 310 hardware and transmitter 315 hardware. For example, a communication channel 320, or a synchronization channel, may be present between the mobile device's 305 modem 310 hardware and the mobile device's transmitter 315 hardware. As such, the mobile device 305 may accurately and seamlessly include information relating to the mobile device's 305 throughput or network connection.

The modem 310 may receive information, such as network information, through a network connection 325. Network information may include a throughput, a network technology, a load, a bandwidth, a delay, communication capabilities, or any other information related to communicating through the network. At times, the network connection 325 may be facilitated by the transmitter 315. The modem 310 may determine network information periodically, dynamically, or in isolated events such as upon installation of the mobile device 305. The modem 310 may request and receive network information, or the modem 310 may receive network information without requesting the network information. The modem 310 may further include a database or may otherwise store network information, such as the most recent network information, the original network information, or a log of network information.

The transmitter 315 may communicate with the modem 310 through the communication channel 320. The transmitter 315 may request and receive network information from the modem 310, or the transmitter 315 may receive network information from the modem 310 without requesting the network information. The network information received by the transmitter 315 from the modem 310, may be the same as, or a subset of, the network information received by the modem 310 via the network connection 325, or may be different from the network information received by the modem 310 via the network connection 325. For example, the modem 310 may receive network information via the network connection 325 and may analyze the network information to send analyzed network information, such as a determined throughput, to the transmitter via the communication channel 320. The transmitter 315 and modem 310 may exchange network information periodically or dynamically. The transmitter 315 may further transmit 330 all or a subset of the network information, or analyzed network information. The transmission 330 may be a broadcast message or may be directed to a particular device, such as a part of a probe response.

At times, the mobile device 305 may move to a different location, or for another reason, may transition between networks, such as 2G networks, 3G networks, LTE networks, etc. Similarly, a same network may experience an increase in traffic, or for another reason, network conditions may change. For example, throughput may decrease based on an increased load on the network. For example, if the mobile device 305 is a soft AP 105, various factors such as movement, network reception, location, power level, etc. may influence the mobile device's 305 network connection or network conditions. At times, the mobile device 305, such as through the modem 310 hardware, may determine, detect, or identify a change in networks or network conditions. Detecting a change in networks or network conditions may prompt the modem 310 hardware to prepare updated network information, or may prompt the transmitter 315 hardware to transmit 330 updated network information. By establishing a communication channel 320 between modem 310 hardware and transmitter 315 hardware the mobile device 305 may accurately transmit information in a beacon or probe response relating to the mobile device's 305 throughput or network connection.

Figure 4:
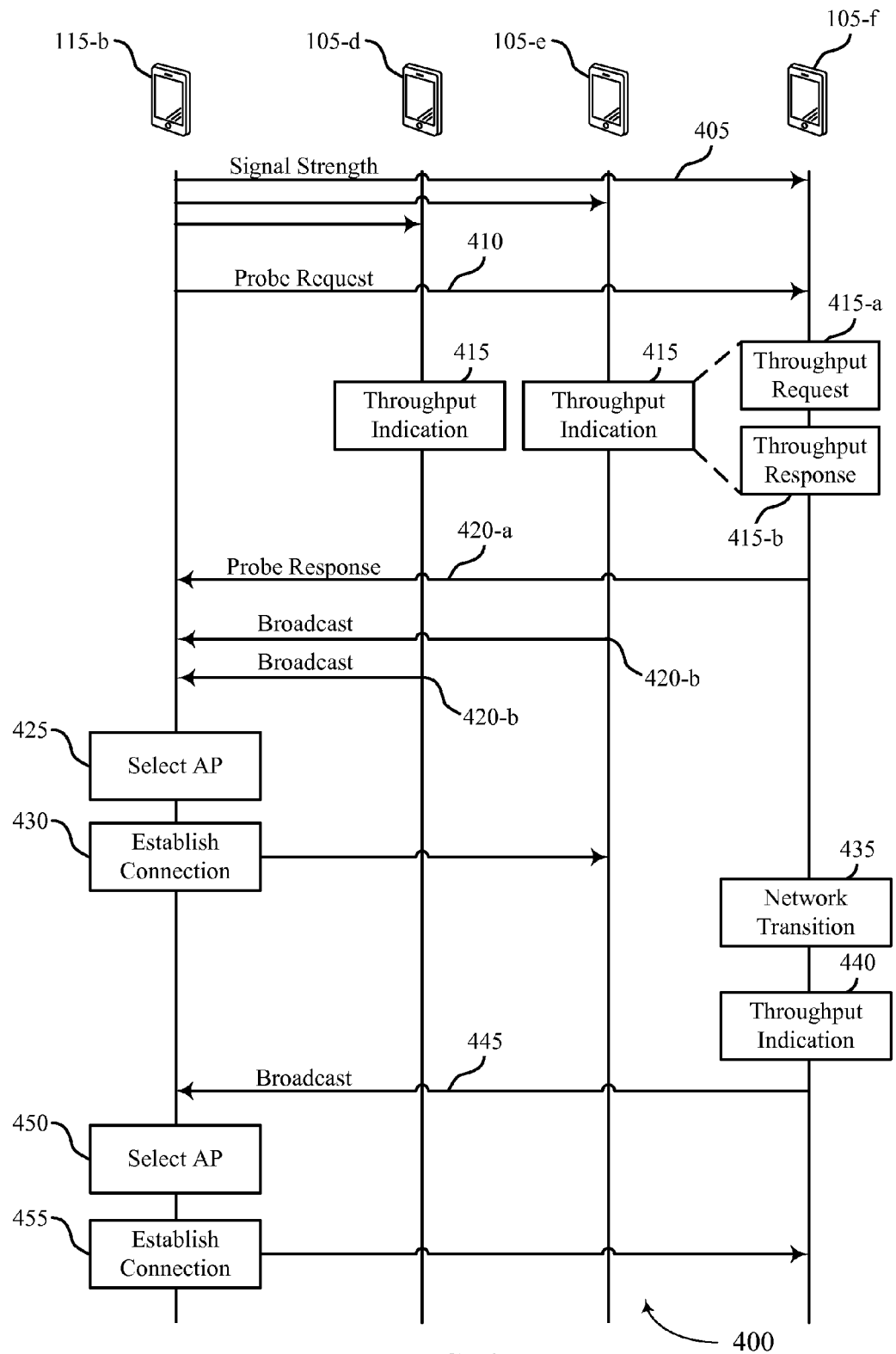
FIG. 4 illustrates an example of a process flow that supports soft AP backend data connection speed within a Wi-Fi beacon, in accordance with various aspects of the present disclosure.

FIG. 4 illustrates an example of a process flow 400 for soft AP backend data connection speed within a Wi-Fi beacon in accordance with various aspects of the present disclosure. Process flow 400 may include a STA 115-b, AP 105-d, AP 105-e, and AP 105-f, which may be examples of a STA 115 and AP 105 described with reference to FIGS. 1-3. In some cases at least one of AP 105-d, AP 105-e, and AP 105-f may be a soft AP. For example, AP 105-f may be a soft AP.

At block 405, the STA 115-b may determine a signal strength for communications with a number of APs, such that the number of APs includes a soft AP.

At block 410, the STA 115-b may transmit a probe request to the number of APs. The probe request may be transmitted to a subset of the number of APs, for example only APs with a signal strength which exceeds a threshold. The AP 105-f may receive a probe request from a STA.

At block 415, the AP 105-d, AP 105-e, and AP 105-f may determine a first throughput indication relating to a first throughput of a first network connection. In some examples, determining the first throughput indication includes identifying network information relating to the first network connection and determining the first throughput indication based on the network information. In some cases, such as shown at block 415-a, identifying network information may include transmitting a network request to a modem of the AP 105-f or receiving, at a modem of the AP 105-f, a network request. Further, at block 415-b, identifying network information may include receiving, from the modem of the AP 105-f, the network information, such that the network information may be responsive to the network request or transmitting, from the modem of the AP 105-f, the network information, such that the network information may be responsive to the network request.

At block 420, the AP 105-d, AP 105-e, and AP 150-f may transmit a first message including the first throughput indication. In some examples, such as illustrated with block 420-b transmitting the first message includes the AP 105-d and AP 105-e broadcasting the first message comprising the first throughput indication. In some cases, such as illustrated with block 420-a, the AP 105-f may transmit the first message including the first throughput indication to the STA 115-b, such that the first message may be responsive to the probe request. The STA 115-b may receive a throughput indication from the number of APs. The STA 115-b may receive a probe response from the number of APs, such that the probe response includes the throughput indication. In some examples receiving the throughput indication includes the STA 115-b receiving a beacon from the number of APs, wherein the beacon comprises the throughput indication.

At block 425, the STA 115-b may select an AP 105-e from the number of APs based on the signal strength and the throughput indication. In some examples selecting the AP from the number of APs includes the STA 115-b displaying connection information relating to a plurality of the number of APs, wherein the connection information comprises the signal strength and the throughput indication. Further, selecting the AP may include the STA 115-b receiving user input indicating a selection of the AP 105-e from the number of APs.

At block 430, the STA 115-b may establish a connection for communication with the selected AP 105-e. In one example, at block 435, the AP 105-f may identify a network transition from the first network connection to a second network connection. At block 440, the AP 105-f may determine a second throughput indication relating to a second throughput of a second network connection. In one example, at block 445, the AP 105-f may transmit a second message including the second throughput indication. The STA 115-b may receive an updated throughput indication from the AP 105-f. At block 450 the STA 115-b may select the AP 105-f from the number of APs based on the updated throughput indication and the signal strength, and at block 455, the STA 115-*b* may establish a connection for communication with the selected AP 105-*f*.

Figure 5:
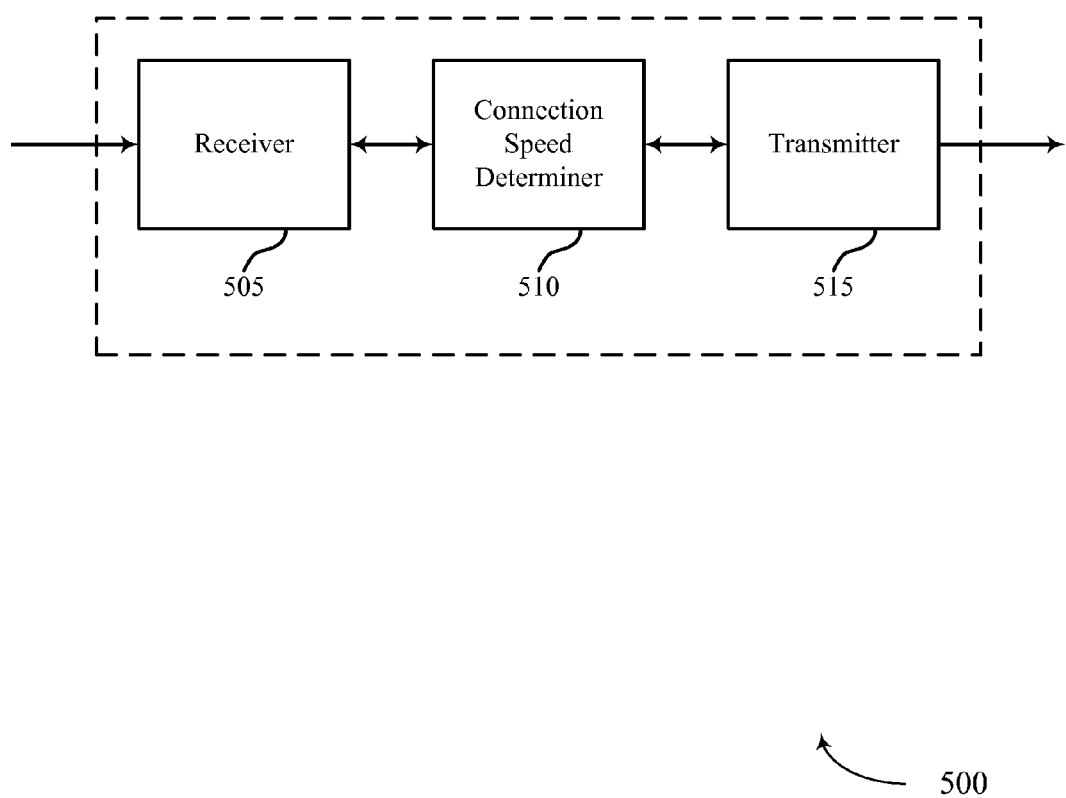
FIGS. 5-7 show block diagrams of a wireless device that supports soft AP backend data connection speed within a Wi-Fi beacon, in accordance with various aspects of the present disclosure.

FIG. 5 shows a block diagram of a wireless device 500 configured for soft AP backend data connection speed within a Wi-Fi beacon in accordance with various aspects of the present disclosure. Wireless device 500 may be an example of aspects of a STA 115 described with reference to FIGS. 1-4. Wireless device 500 may include a receiver 505, a connection speed determiner 510, or a transmitter 515. Wireless device 500 may also include a processor. Each of these components may be in communication with each other.

The receiver 505 may receive information such as packets, user data, or control information associated with various information channels (e.g., control channels, data channels, and information related to soft AP backend data connection speed within a Wi-Fi beacon, etc.). Information may be passed on to the connection speed determiner 510, and to other components of wireless device 500.

The connection speed determiner 510 may determine, a signal strength for communications with a number of APs, wherein the number of APs comprises a soft AP, receive a throughput indication from the number of APs, and select an AP from the number of APs based at least in part on the signal strength and the throughput indication.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
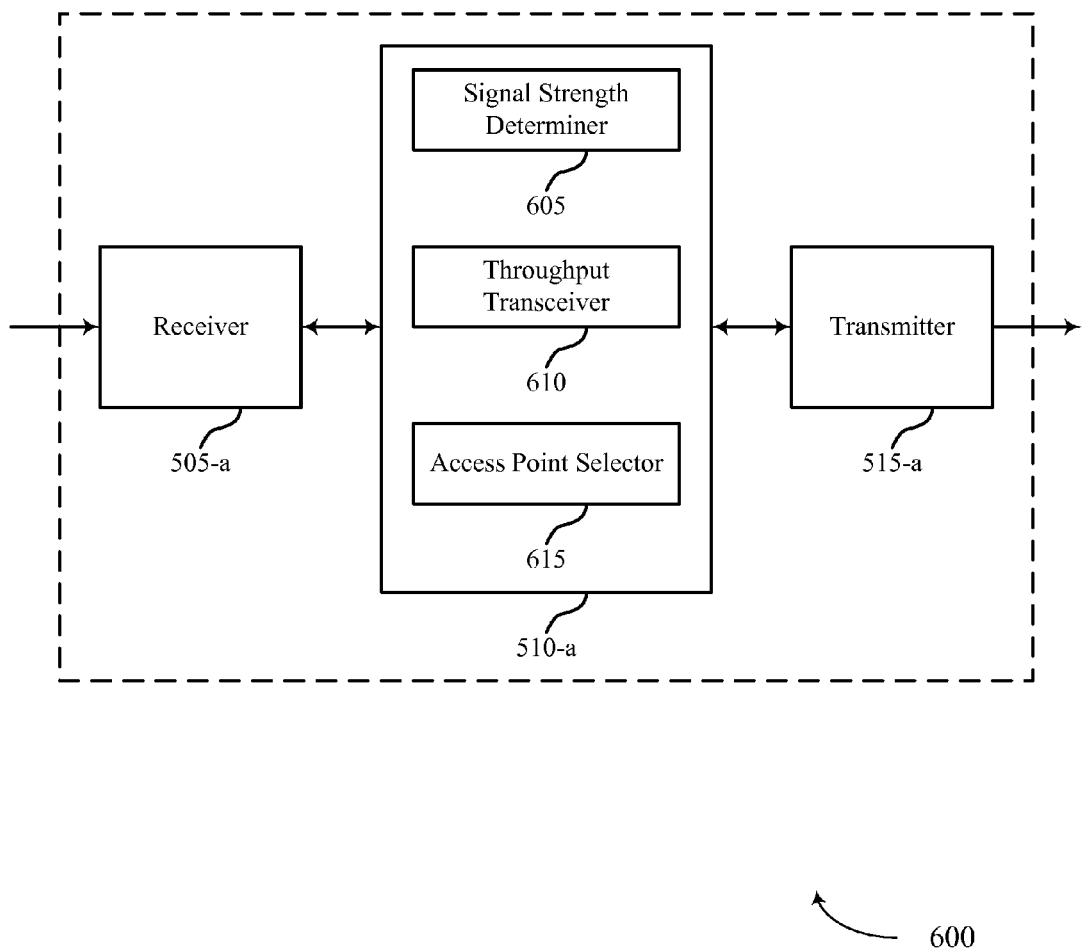

FIG. 6 shows a block diagram of a wireless device 600 for soft AP backend data connection speed within a Wi-Fi beacon in accordance with various aspects of the present disclosure. Wireless device 600 may be an example of aspects of a wireless device 500 or a STA 115 described with reference to FIGS. 1-5. Wireless device 600 may include a receiver 505-*a*, a connection speed determiner 510-*a*, or a transmitter 515-*a*. Wireless device 600 may also include a processor. Each of these components may be in communication with each other. The connection speed determiner 510-*a* may also include a signal strength determiner 605, a throughput transceiver 610, and an access point selector 615.

The receiver 505-*a* may receive information which may be passed on to connection speed determiner 510-*a*, and to other components of wireless device 600. The connection speed determiner 510-*a* may perform the operations described with reference to FIG. 5. The transmitter 515-*a* may transmit signals received from other components of wireless device 600.

The signal strength determiner 605 may determine a signal strength for communications with a number of APs, wherein the number of APs comprises a soft AP as described with reference to FIGS. 2A-4.

The throughput transceiver 610 may receive a throughput indication from the number of APs as described with reference to FIGS. 2A-4. In some examples, receiving the throughput indication comprises receiving a beacon from the number of APs, wherein the beacon comprises the throughput indication. In some examples, receiving the throughput indication comprises transmitting a probe request to the number of APs. The throughput transceiver 610 may also receive a probe response from the number of APs, wherein the probe response comprises the throughput indication. The throughput transceiver 610 may also receive an updated throughput indication from the soft AP.

The access point selector 615 may select an AP from the number of APs based at least in part on the signal strength and the throughput indication as described with reference to FIGS. 2A-4. The access point selector 615 may also select the soft AP from the number of APs based at least in part on the updated throughput indication and the signal strength.

Figure 7:
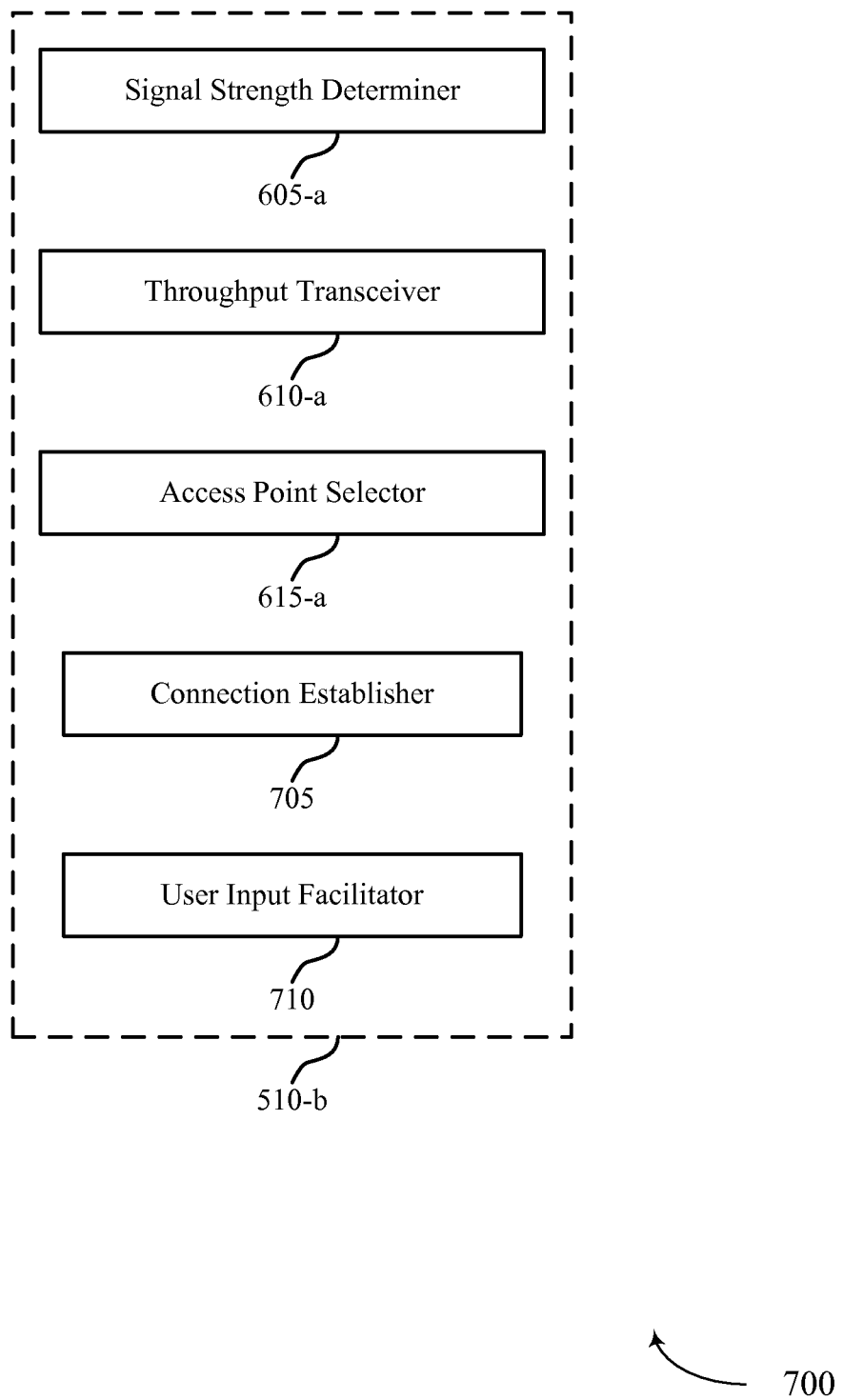

FIG. 7 shows a block diagram 700 of a connection speed determiner 510-*b* which may be a component of a wireless device 500 or a wireless device 600 for soft AP backend data connection speed within a Wi-Fi beacon in accordance with various aspects of the present disclosure. The connection speed determiner 510-*b* may be an example of aspects of a connection speed determiner 510 described with reference to FIGS. 5-6. The connection speed determiner 510-*b* may include a signal strength determiner 605-*a*, a throughput transceiver 610-*a*, and an access point selector 615-*a*. Each of these modules may perform the functions described with reference to FIG. 6. The connection speed determiner 510-*b* may also include a connection establisher 705, and an user input facilitator 710.

The connection establisher 705 may establish a connection for communication with the selected AP as described with reference to FIGS. 2A-4.

The user input facilitator 710 may be configured such that selecting the AP from the number of APs may include displaying connection information relating to a plurality of the number of APs, wherein the connection information may include the signal strength and the throughput indication as described with reference to FIGS. 2A-4. The user input facilitator 710 may also receive user input indicating a selection of the AP from the number of APs.

Figure 8:
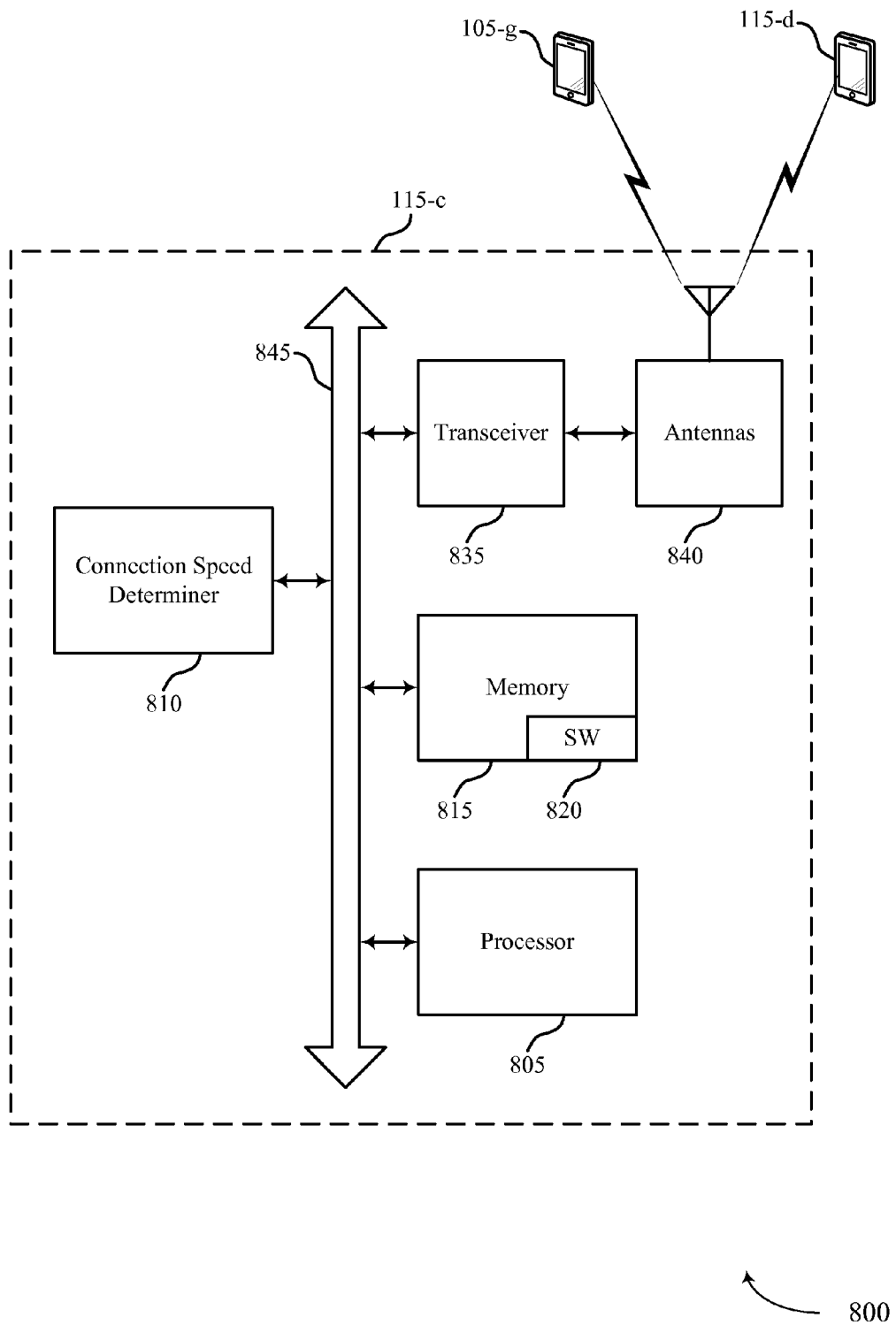
FIG. 8 illustrates a block diagram of a system including a station (STA) that supports soft AP backend data connection speed within a Wi-Fi beacon, in accordance with various aspects of the present disclosure.

FIG. 8 shows a diagram of a system 800 including a STA 115 configured for soft AP backend data connection speed within a Wi-Fi beacon in accordance with various aspects of the present disclosure. System 800 may include STA 115-*c*, which may be an example of a wireless device 500, a wireless device 600, or a STA 115 described with reference to FIGS. 1, 2A, 2B, and 4-7. STA 115-*c* may include a connection speed determiner 810, which may be an example of a connection speed determiner 510 described with reference to FIGS. 5-7. STA 115-*c* may also include components for bi-directional voice and data communications including components for transmitting communications and components for receiving communications. For example, STA 115-*c* may communicate bi-directionally with STA 115-*d* or AP 105-*g*.

STA 115-*c* may also include a processor 805, and memory 815 (including software (SW)) 820, a transceiver 835, and at least one antenna(s) 840, each of which may communicate, directly or indirectly, with one another (e.g., via buses 845). The transceiver 835 may communicate bi-directionally, via the antenna(s) 840 or wired or wireless links, with at least one network, as described above. For example, the transceiver 835 may communicate bi-directionally with a AP 105 or another STA 115. The transceiver 835 may include a modem to modulate the packets and provide the modulated packets to the antenna(s) 840 for transmission, and to demodulate packets received from the antenna(s) 840. While STA 115-*c* may include a single antenna 840, STA 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., soft AP backend data connection speed within a Wi-Fi beacon, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
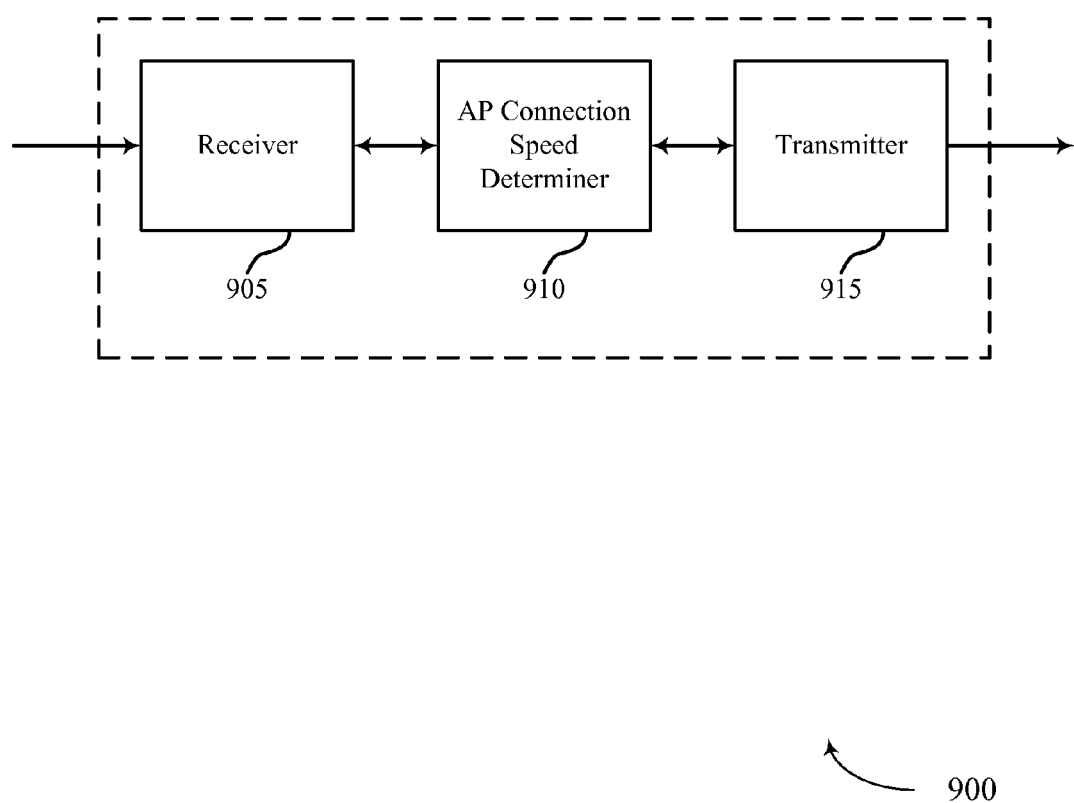
FIGS. 9-11 show block diagrams of a wireless device that supports soft AP backend data connection speed within a Wi-Fi beacon, in accordance with various aspects of the present disclosure.

FIG. 9 shows a block diagram of a wireless device 900 configured for soft AP backend data connection speed within a Wi-Fi beacon in accordance with various aspects of the present disclosure. Wireless device 900 may be an example of aspects of an AP 105 described with reference to FIGS. 1-8. Wireless device 900 may include a receiver 905, an AP connection speed determiner 910, or a transmitter 915. Wireless device 900 may also include a processor. Each of these components may be in communication with each other. In some cases, wireless device 900 is a soft AP 105.

The receiver 905 may receive information such as packets, user data, or control information associated with various information channels (e.g., control channels, data channels, and information related to soft AP backend data connection speed within a Wi-Fi beacon, etc.). Information may be passed on to the AP connection speed determiner 910, and to other components of wireless device 900.

The AP connection speed determiner 910 may determine a first throughput indication relating to a first throughput of a first network connection, and transmit a first message comprising the first throughput indication.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
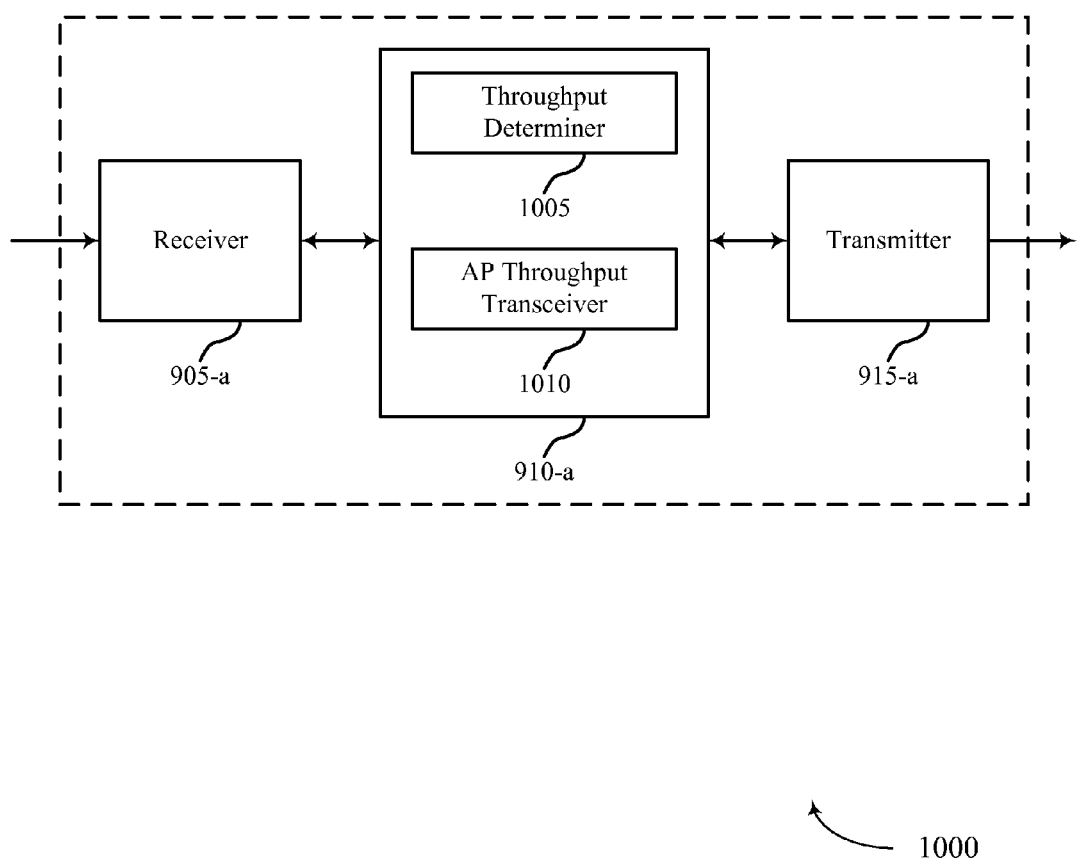

FIG. 10 shows a block diagram of a wireless device 1000 for soft AP backend data connection speed within a Wi-Fi beacon in accordance with various aspects of the present disclosure. Wireless device 1000 may be an example of aspects of a wireless device 900 or an AP 105 described with reference to FIGS. 1-9. Wireless device 1000 may include a receiver 905-*a*, an AP connection speed determiner 910-*a*, or a transmitter 915-*a*. Wireless device 1000 may also include a processor. Each of these components may be in communication with each other. The AP connection speed determiner 910-*a* may also include a throughput determiner 1005, and an AP throughput transceiver 1010. In some cases, wireless device 1000 is a soft AP 105.

The receiver 905-*a* may receive information which may be passed on to AP connection speed determiner 910-*a*, and to other components of wireless device 1000. The AP connection speed determiner 910-*a* may perform the operations described with reference to FIG. 9. The transmitter 915-*a* may transmit signals received from other components of wireless device 1000.

The throughput determiner 1005 may determine a first throughput indication relating to a first throughput of a first network connection as described with reference to FIGS. 2A-4. The throughput determiner 1005 may also determine the first throughput indication based at least in part on the network information. The throughput determiner 1005 may also determine a second throughput indication relating to a second throughput of a second network connection.

The AP throughput transceiver 1010 may transmit a first message comprising the first throughput indication as described with reference to FIGS. 2A-4. In some examples, transmitting the first message comprises broadcasting the first message comprising the first throughput indication. In some examples, transmitting the first message comprises receiving a probe request from a STA. The AP throughput transceiver 1010 may also transmit the first message comprising the first throughput indication to the STA, wherein the first message is responsive to the probe request. The AP throughput transceiver 1010 may also transmit a second message comprising the second throughput indication.

Figure 11:
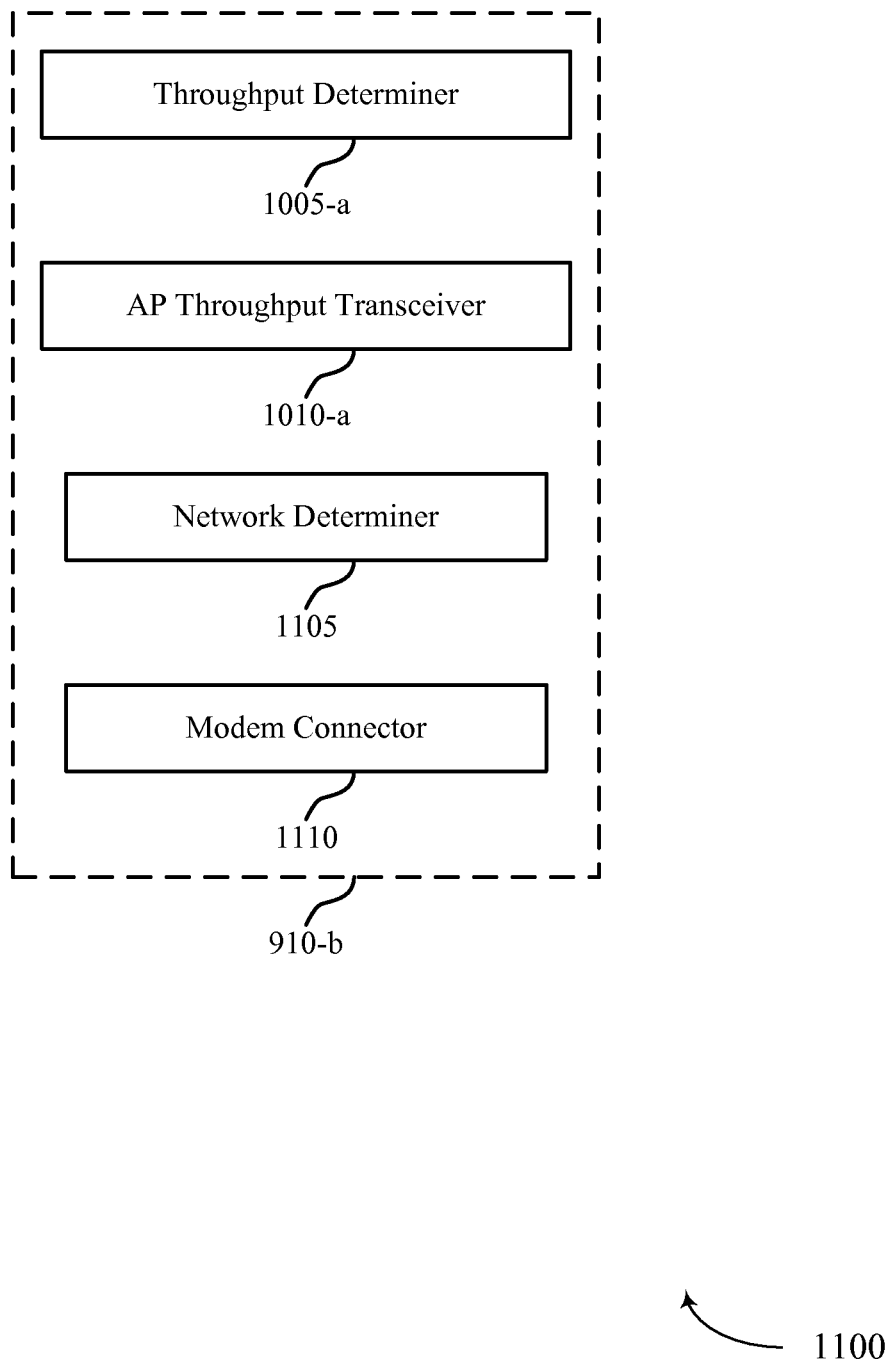

FIG. 11 shows a block diagram 1100 of an AP connection speed determiner 910-*b* which may be a component of a wireless device 900 or a wireless device 1000 for soft AP backend data connection speed within a Wi-Fi beacon in accordance with various aspects of the present disclosure. The AP connection speed determiner 910-*b* may be an example of aspects of an AP connection speed determiner 910 described with reference to FIGS. 9-10. The AP connection speed determiner 910-*b* may include a throughput determiner 1005-*a*, and an AP throughput transceiver 1010-*a*. Each of these modules may perform the functions described with reference to FIG. 10. The AP connection speed determiner 910-*b* may also include a network determiner 1105, and a modem connector 1110.

The network determiner 1105 may be configured such that determining the first throughput indication may include identifying network information relating to the first network connection as described with reference to FIGS. 2A-4. In some examples, identifying network information comprises transmitting a network request to a modem of the soft AP. The network determiner 1105 may also receive, from the modem of the soft AP, the network information, wherein the network information is responsive to the network request. The network determiner 1105 may also identify a network transition from the first network connection to the second network connection.

The modem connector 1110 may be configured such that identifying network information may include receiving, at a modem of the soft AP, a network request as described with reference to FIGS. 2A-4. The modem connector 1110 may also transmit, from the modem of the soft AP, the network information, wherein the network information is responsive to the network request.

Figure 12:
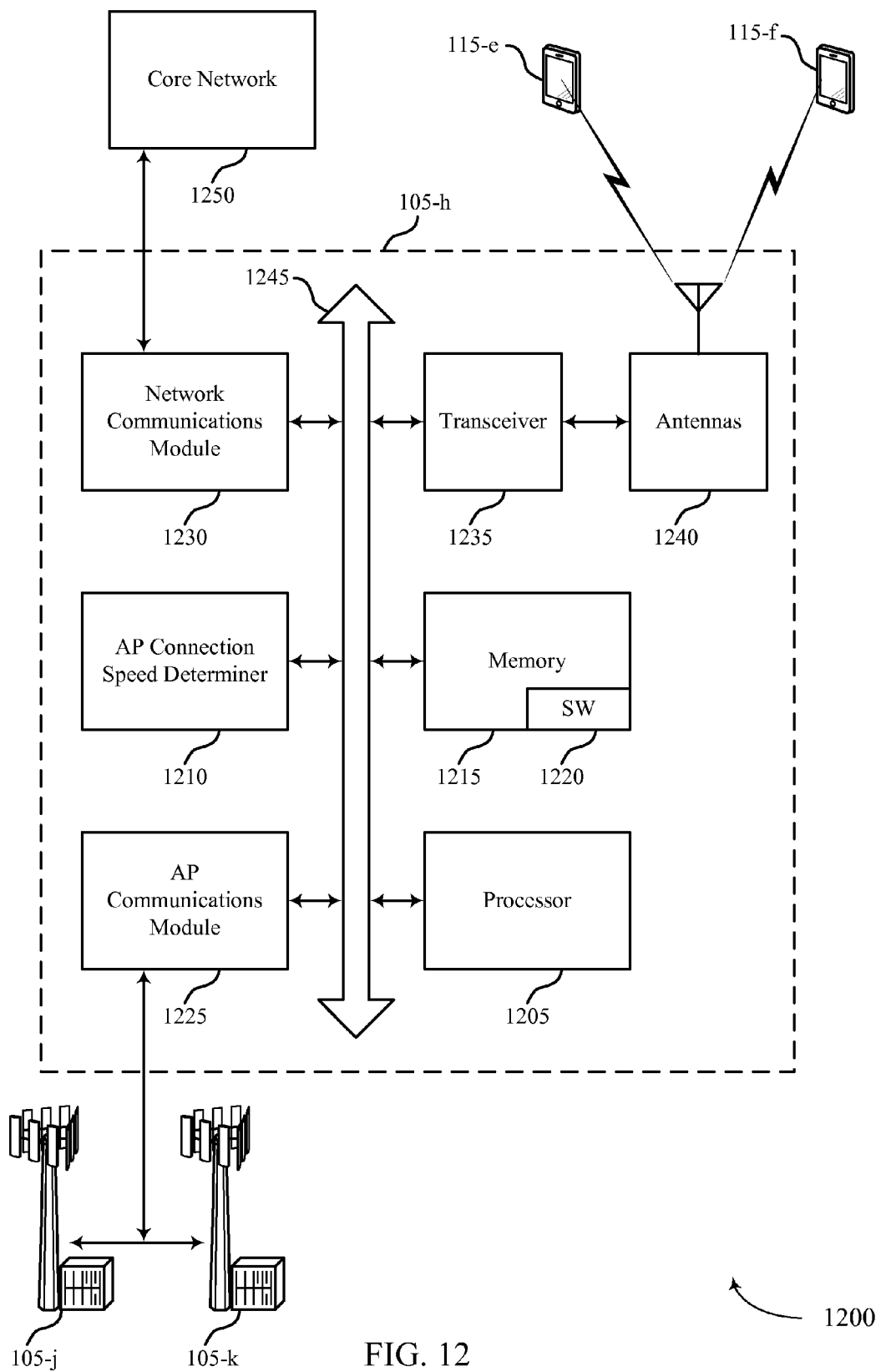
FIG. 12 illustrates a block diagram of a system including an AP that supports soft AP backend data connection speed within a Wi-Fi beacon, in accordance with various aspects of the present disclosure.

FIG. 12 shows a diagram of a system 1200 including an AP 105 configured for soft AP backend data connection speed within a Wi-Fi beacon in accordance with various aspects of the present disclosure. System 1200 may include AP 105-*h*, which may be an example of a wireless device 900, a wireless device 1000, or an AP 105 described with reference to FIGS. 1, 2A, 2B, 3, 4, and 9-11. AP 105-*h* may include an AP connection speed determiner 1210, which may be an example of an AP connection speed determiner 910 described with reference to FIGS. 9-11. AP 105-*h* may also include components for bi-directional voice and data communications including components for transmitting communications and components for receiving communications. For example, AP 105-*h* may communicate bi-directionally with STA 115-*e* or STA 115-*f*. In some cases, AP 105-*h* is a soft AP 105.

In some cases, AP 105-*h* may have at least one wired or wireless backhaul link. For example, AP 105-*h* may have a wireless backhaul link to a core network 1250. AP 105-*h* may also communicate with other APs 105, such as AP 105-*j* and AP 105-*k* via backhaul links. Each of the APs 105 may communicate with STAs 115 using the same or different wireless communications technologies. In some cases, AP 105-*h* may communicate with other APs such as AP 105-*j* or AP 105-*k* utilizing AP communications module 1225. In some examples, AP communications module 1225 may provide an X2 interface within a Long Term Evolution (LTE)/LTE-A wireless communication network technology to provide communication between some of the APs 105. In some cases, AP 105-*h* may communicate with the core network 1250 through network communications module 1230.

The AP 105-*h* may include a processor 1205, memory 1215 (including software (SW) 1220), transceiver 1235, and antenna(s) 1240, which each may be in communication, directly or indirectly, with one another (e.g., over bus system 1245). The transceiver 1235 may be configured to communicate bi-directionally, via the antenna(s) 1240, with the STAs 115, which may be multi-mode devices. The transceiver 1235 (or other components of the AP 105-*h*) may also be configured to communicate bi-directionally, via the antennas 1240, with at least one other AP (not shown). The transceiver 1235 may include a modem configured to modulate the packets and provide the modulated packets to the antennas 1240 for transmission, and to demodulate packets received from the antennas 1240. The AP 105-*h* may include multiple transceivers 1235, each with at least one associated antenna 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., soft AP backend data connection speed within a Wi-Fi beacon, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The AP communications module 1225 may manage communications with other APs 105. In some cases, a communications management module may include a controller or scheduler for controlling communications with STAs 115 in cooperation with other APs 105. For example, the AP communications module 1225 may coordinate scheduling for transmissions to STAs 115 for various interference mitigation techniques such as beamforming or joint transmission.

The components of wireless device 500, wireless device 600, connection speed determiner 510, connection speed determiner 810, wireless device 900, wireless device 1000, AP connection speed determiner 910, and AP connection speed determiner 1210 may, individually or collectively, be implemented with at least one ASIC adapted to perform some or all of the applicable functions in hardware. Alternatively, the functions may be performed by at least one other processing unit (or core), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by at least one general or application-specific processor.

Figure 13:
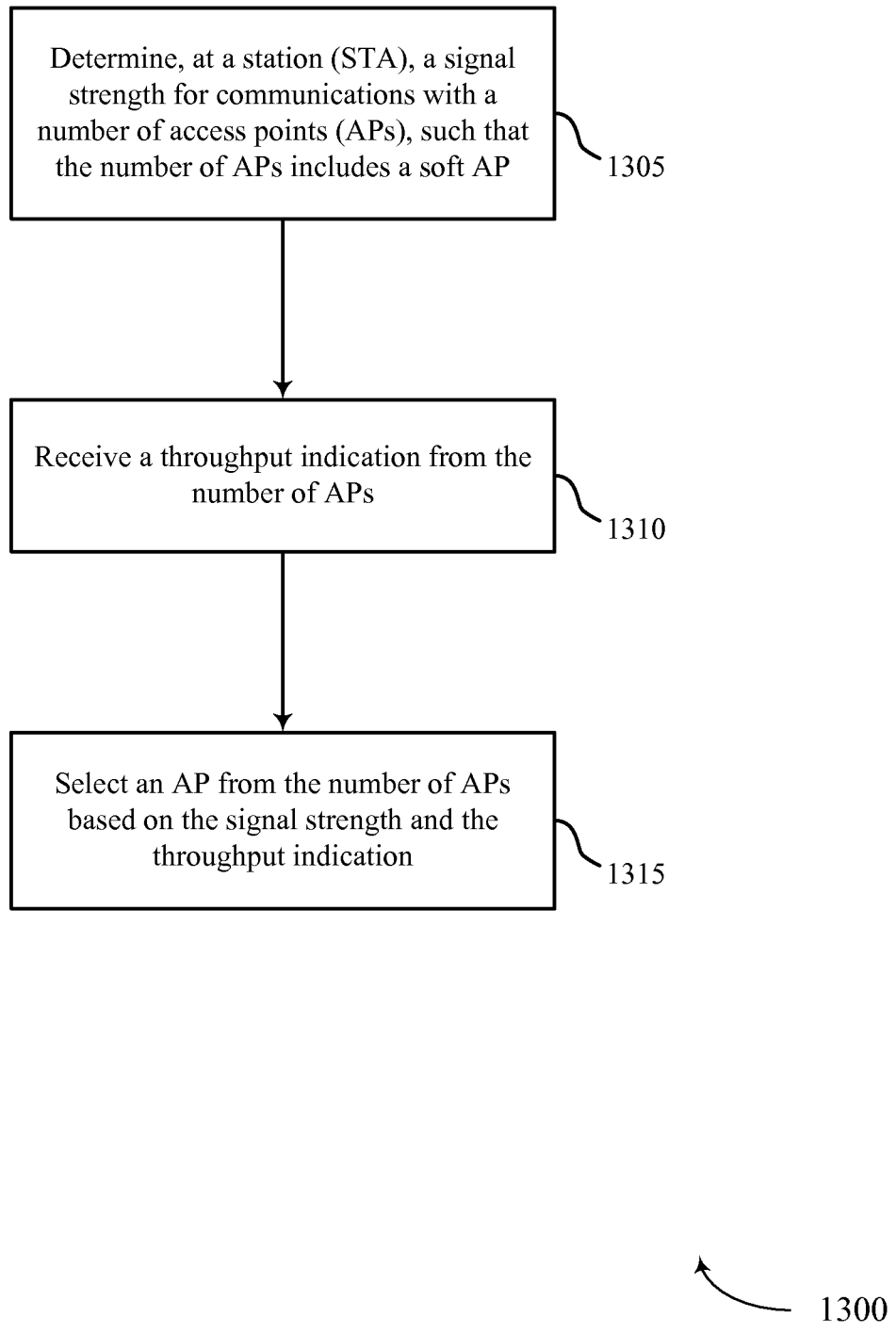
FIGS. 13-18 illustrate methods for soft AP backend data connection speed within a Wi-Fi beacon, in accordance with various aspects of the present disclosure.

FIG. 13 shows a flowchart illustrating a method 1300 for soft AP backend data connection speed within a Wi-Fi beacon in accordance with various aspects of the present disclosure. The operations of method 1300 may be implemented by a STA 115 or its components as described with reference to FIGS. 1-12. For example, the operations of method 1300 may be performed by the connection speed determiner 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware.

At block 1305, the STA 115 may determine a signal strength for communications with a number of APs, wherein the number of APs comprises a soft AP as described with reference to FIGS. 2A-4. In certain examples, the operations of block 1305 may be performed by the signal strength determiner 605 as described with reference to FIG. 6.

At block 1310, the STA 115 may receive a throughput indication from the number of APs as described with reference to FIGS. 2A-4. In certain examples, the operations of block 1310 may be performed by the throughput transceiver 610 as described with reference to FIG. 6.

At block 1315, the STA 115 may select an AP from the number of APs based at least in part on the signal strength and the throughput indication as described with reference to FIGS. 2A-4. In certain examples, the operations of block 1315 may be performed by the access point selector 615 as described with reference to FIG. 6.

Figure 14:
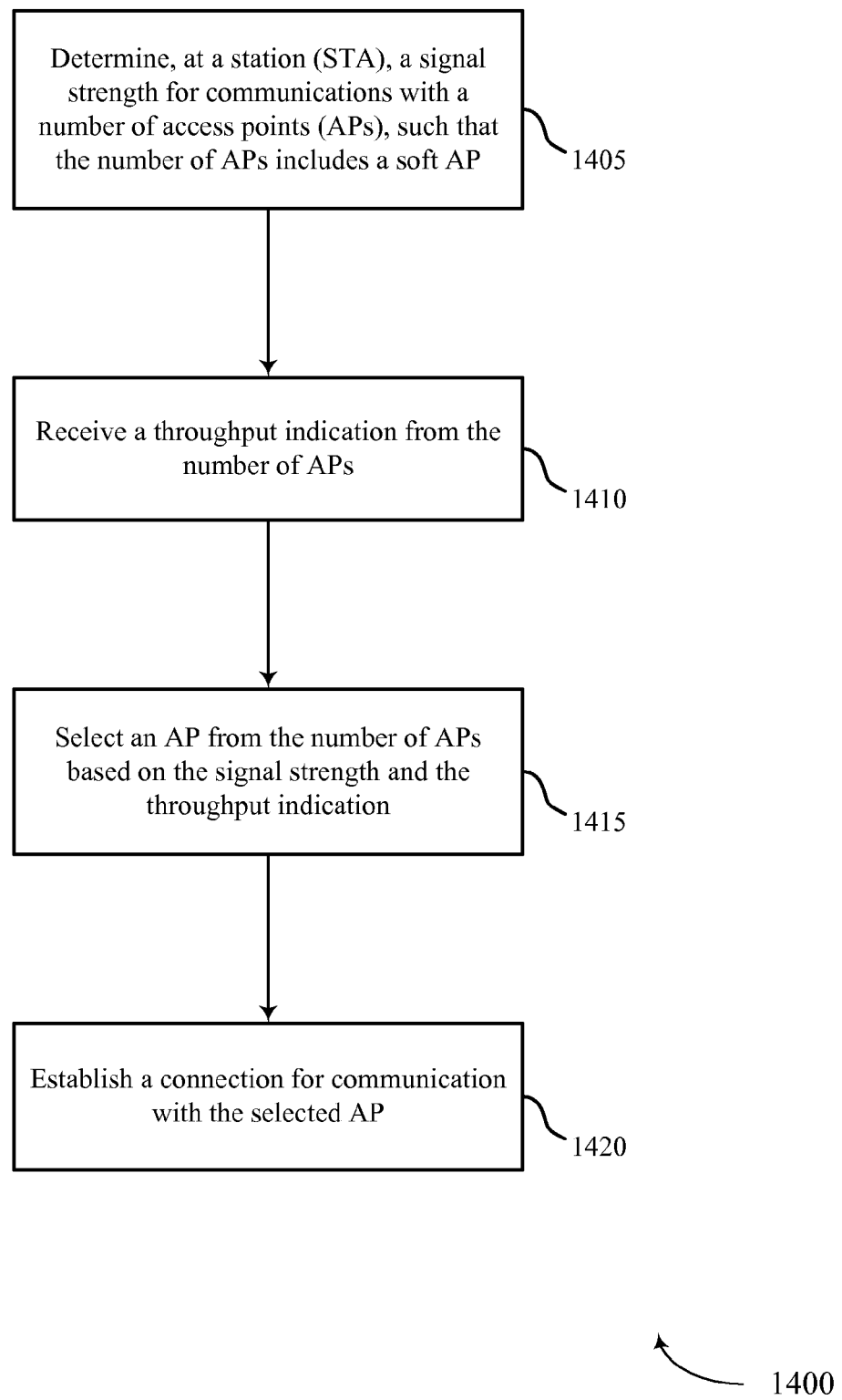

FIG. 14 shows a flowchart illustrating a method 1400 for soft AP backend data connection speed within a Wi-Fi beacon in accordance with various aspects of the present disclosure. The operations of method 1400 may be implemented by a STA 115 or its components as described with reference to FIGS. 1-12. For example, the operations of method 1400 may be performed by the connection speed determiner 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1400 may also incorporate aspects of method 1300 of FIG. 13.

At block 1405, the STA 115 may determine a signal strength for communications with a number of APs, wherein the number of APs comprises a soft AP as described with reference to FIGS. 2A-4. In certain examples, the operations of block 1405 may be performed by the signal strength determiner 605 as described with reference to FIG. 6.

At block 1410, the STA 115 may receive a throughput indication from the number of APs as described with reference to FIGS. 2A-4. In certain examples, the operations of block 1410 may be performed by the throughput transceiver 610 as described with reference to FIG. 6.

At block 1415, the STA 115 may select an AP from the number of APs based at least in part on the signal strength and the throughput indication as described with reference to FIGS. 2A-4. In certain examples, the operations of block 1415 may be performed by the access point selector 615 as described with reference to FIG. 6.

At block 1420, the STA 115 may establish a connection for communication with the selected AP as described with reference to FIGS. 2A-4. In certain examples, the operations of block 1420 may be performed by the connection establisher 705 as described with reference to FIG. 7.

Figure 15:
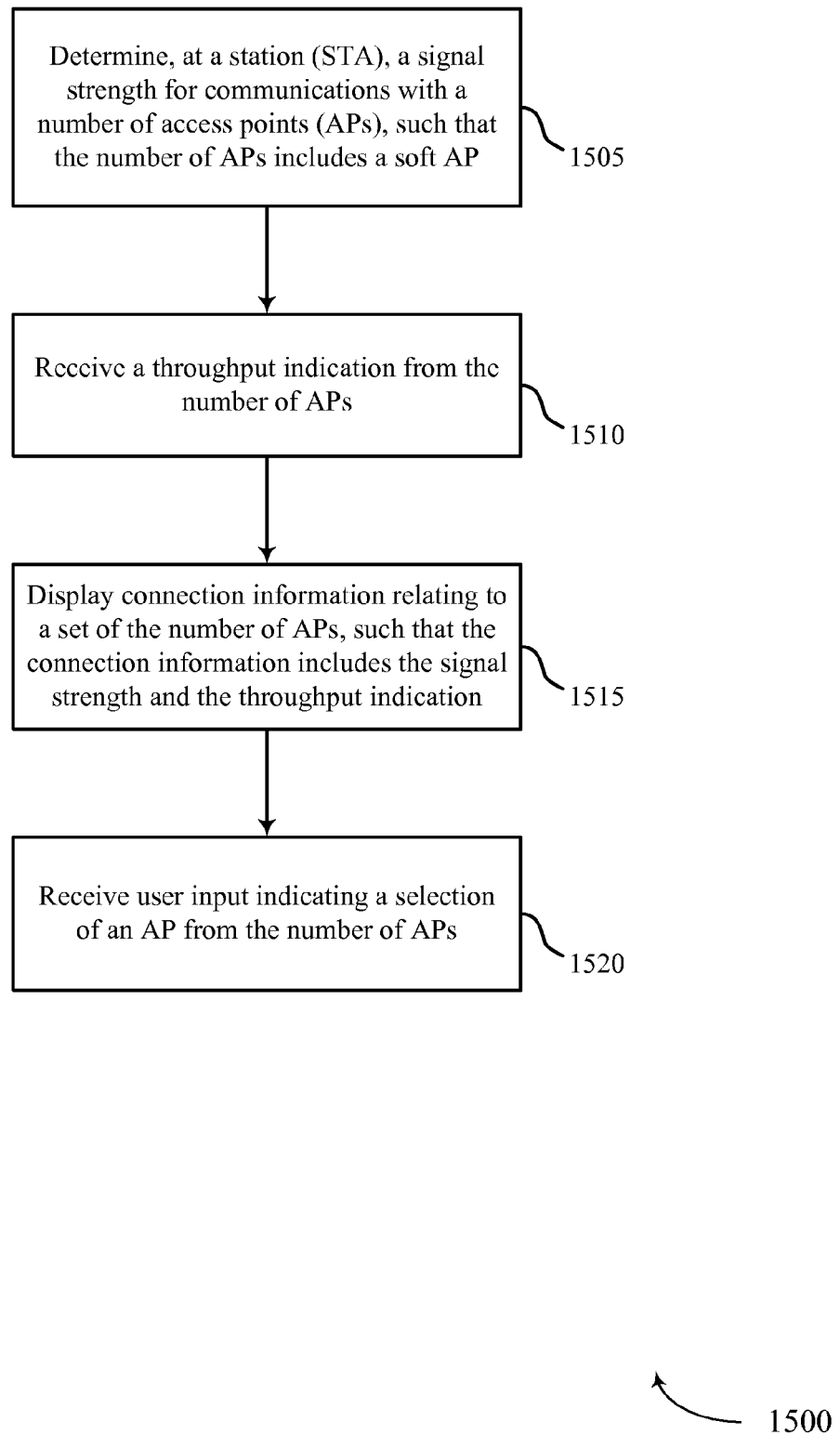

FIG. 15 shows a flowchart illustrating a method 1500 for soft AP backend data connection speed within a Wi-Fi beacon in accordance with various aspects of the present disclosure. The operations of method 1500 may be implemented by a STA 115 or its components as described with reference to FIGS. 1-12. For example, the operations of method 1500 may be performed by the connection speed determiner 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1500 may also incorporate aspects of methods 1300, and 1400 of FIGS. 13-14.

At block 1505, the STA 115 may determine a signal strength for communications with a number of APs, wherein the number of APs comprises a soft AP as described with reference to FIGS. 2A-4. In certain examples, the operations of block 1505 may be performed by the signal strength determiner 605 as described with reference to FIG. 6.

At block 1510, the STA 115 may receive a throughput indication from the number of APs as described with reference to FIGS. 2A-4. In certain examples, the operations of block 1510 may be performed by the throughput transceiver 610 as described with reference to FIG. 6.

At block 1515, the STA 115 may select an AP from the number of APs based at least in part on the signal strength and the throughput indication as described with reference to FIGS. 2A-4. In certain examples, the operations of block 1515 may be performed by the access point selector 615 as described with reference to FIG. 6 or the user input facilitator 710 as described with reference to FIG. 7. In some cases, selecting the AP from the number of APs comprises displaying connection information relating to a plurality of the number of APs, wherein the connection information comprises the signal strength and the throughput indication.

At block 1520, the STA 115 may receive user input indicating a selection of the AP from the number of APs as described with reference to FIGS. 2A-4. In certain examples, the operations of block 1520 may be performed by the user input facilitator 710 as described with reference to FIG. 7.

Figure 16:
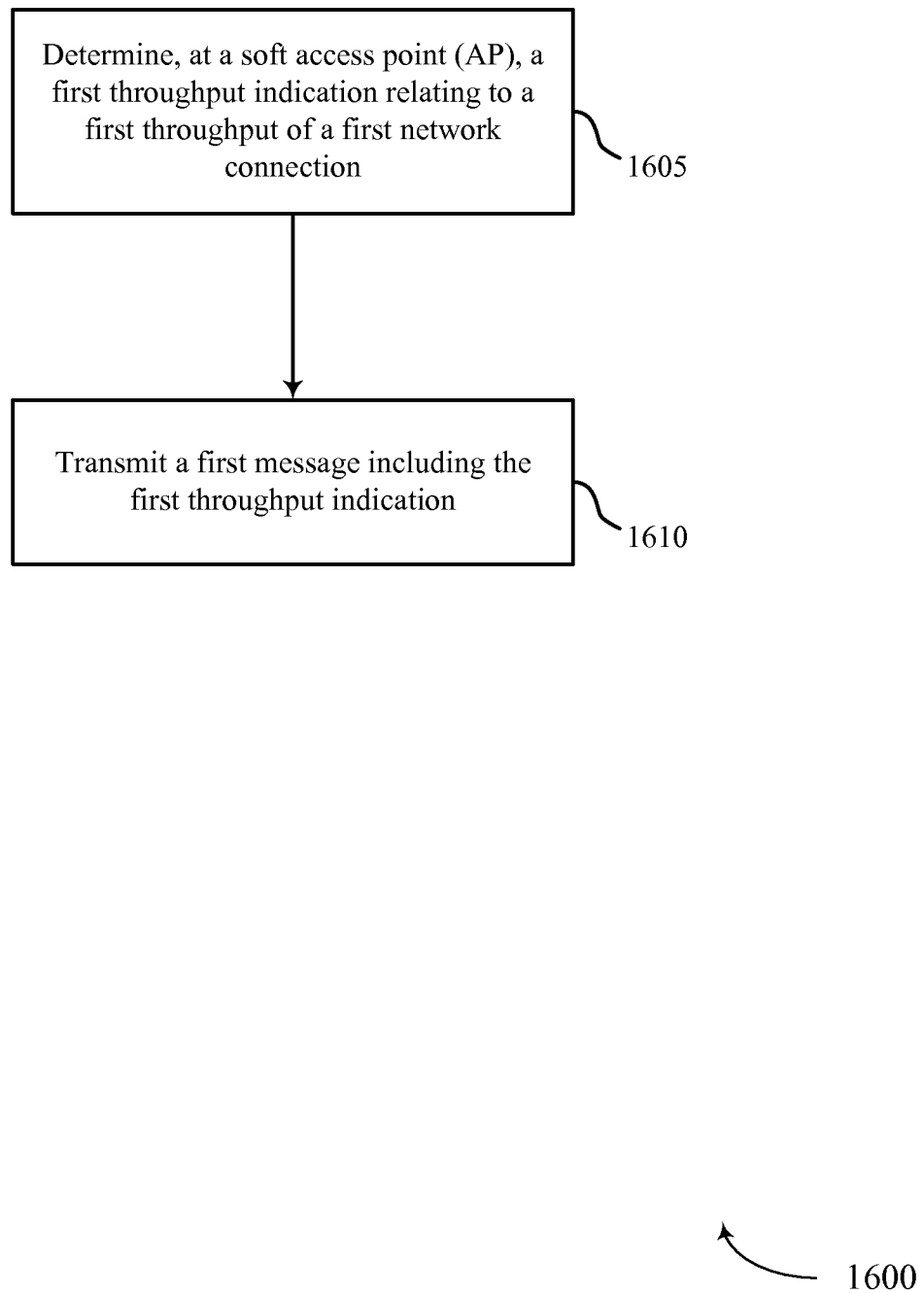

FIG. 16 shows a flowchart illustrating a method 1600 for soft AP backend data connection speed within a Wi-Fi beacon in accordance with various aspects of the present disclosure. The operations of method 1600 may be implemented by a soft AP 105 or its components as described with reference to FIGS. 1-12. For example, the operations of method 1600 may be performed by the AP connection speed determiner 910 as described with reference to FIGS. 9-12. In some examples, a soft AP 105 may execute a set of codes to control the functional elements of the AP 105 to perform the functions described below. Additionally or alternatively, the soft AP 105 may perform aspects the functions described below using special-purpose hardware. The method 1600 may also incorporate aspects of methods 1300, 1400, and 1500 of FIGS. 13-15.

At block 1605, the soft AP 105 may determine a first throughput indication relating to a first throughput of a first network connection as described with reference to FIGS. 2A-4. In certain examples, the operations of block 1605 may be performed by the throughput determiner 1005 as described with reference to FIG. 10.

At block 1610, the soft AP 105 may transmit a first message comprising the first throughput indication as described with reference to FIGS. 2A-4. In certain examples, the operations of block 1610 may be performed by the AP throughput transceiver 1010 as described with reference to FIG. 10.

Figure 17:
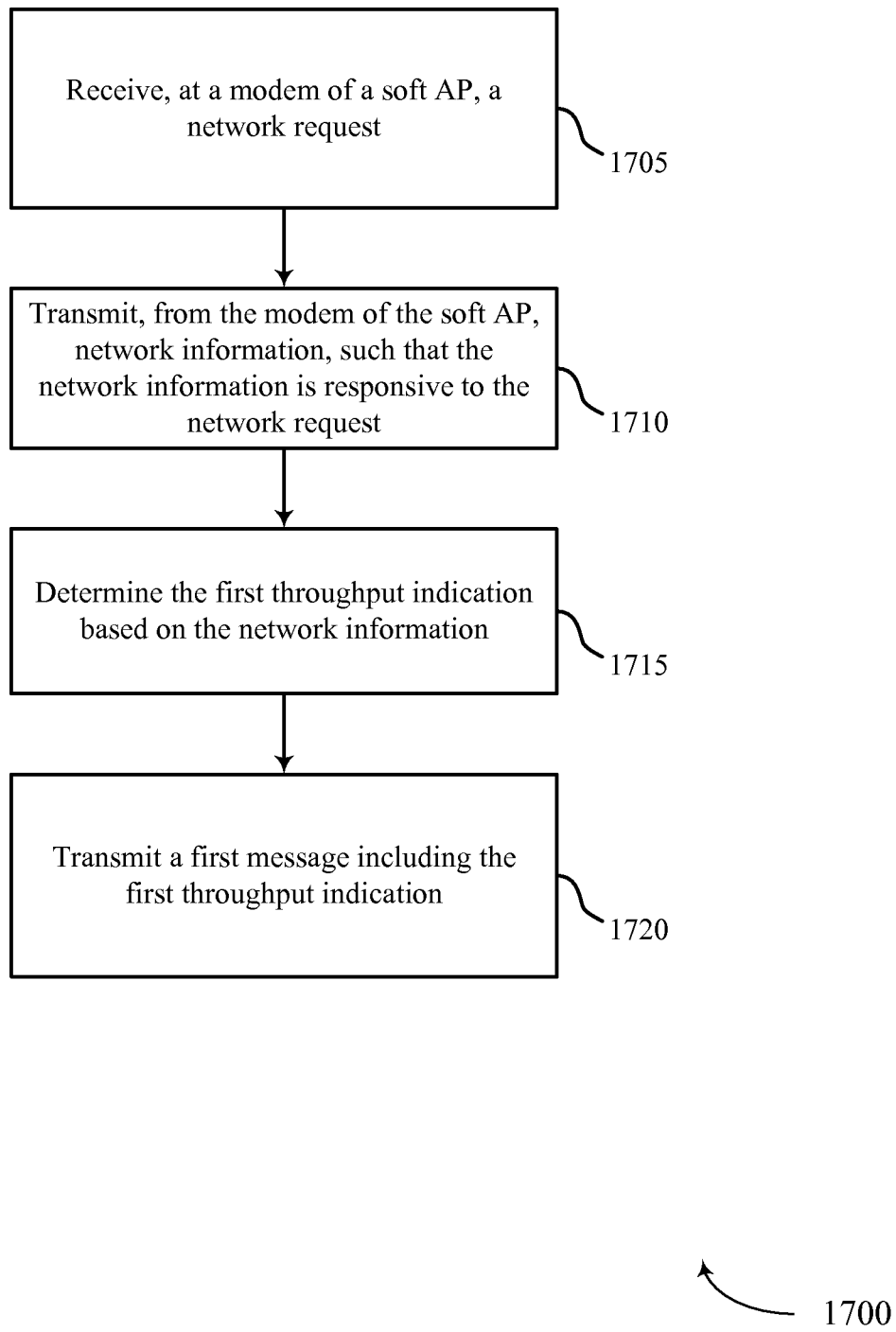

FIG. 17 shows a flowchart illustrating a method 1700 for soft AP backend data connection speed within a Wi-Fi beacon in accordance with various aspects of the present disclosure. The operations of method 1700 may be implemented by a soft AP 105 or its components as described with reference to FIGS. 1-12. For example, the operations of method 1700 may be performed by the AP connection speed determiner 910 as described with reference to FIGS. 9-12. In some examples, a soft AP 105 may execute a set of codes to control the functional elements of the AP 105 to perform the functions described below. Additionally or alternatively, the soft AP 105 may perform aspects the functions described below using special-purpose hardware. The method 1700 may also incorporate aspects of methods 1300, 1400, 1500, and 1600 of FIGS. 13-16.

At block 1705, the soft AP 105 may determine a first throughput indication relating to a first throughput of a first network connection as described with reference to FIGS. 2A-4. In certain examples, the operations of block 1705 may be performed by the throughput determiner 1005 as described with reference to FIG. 10, the network determiner 1105 as described with reference to FIG. 11, or the modem connector 1110 as described with reference to FIG. 11. In some cases, determining the first throughput indication includes identifying network information relating to the first network connection. Identifying network information may include receiving, at a modem of the soft AP 105, a network request.

At block 1710, the soft AP 105 may transmit, from the modem of the soft AP 105, the network information, wherein the network information is responsive to the network request as described with reference to FIGS. 2A-4. In certain examples, the operations of block 1710 may be performed by the modem connector 1110 as described with reference to FIG. 11.

At block 1715, the soft AP 105 may determine the first throughput indication based at least in part on the network information as described with reference to FIGS. 2A-4. In certain examples, the operations of block 1715 may be performed by the throughput determiner 1005 as described with reference to FIG. 10.

At block 1720, the soft AP 105 may transmit a first message comprising the first throughput indication as described with reference to FIGS. 2A-4. In certain examples, the operations of block 1720 may be performed by the AP throughput transceiver 1010 as described with reference to FIG. 10.

Figure 18:
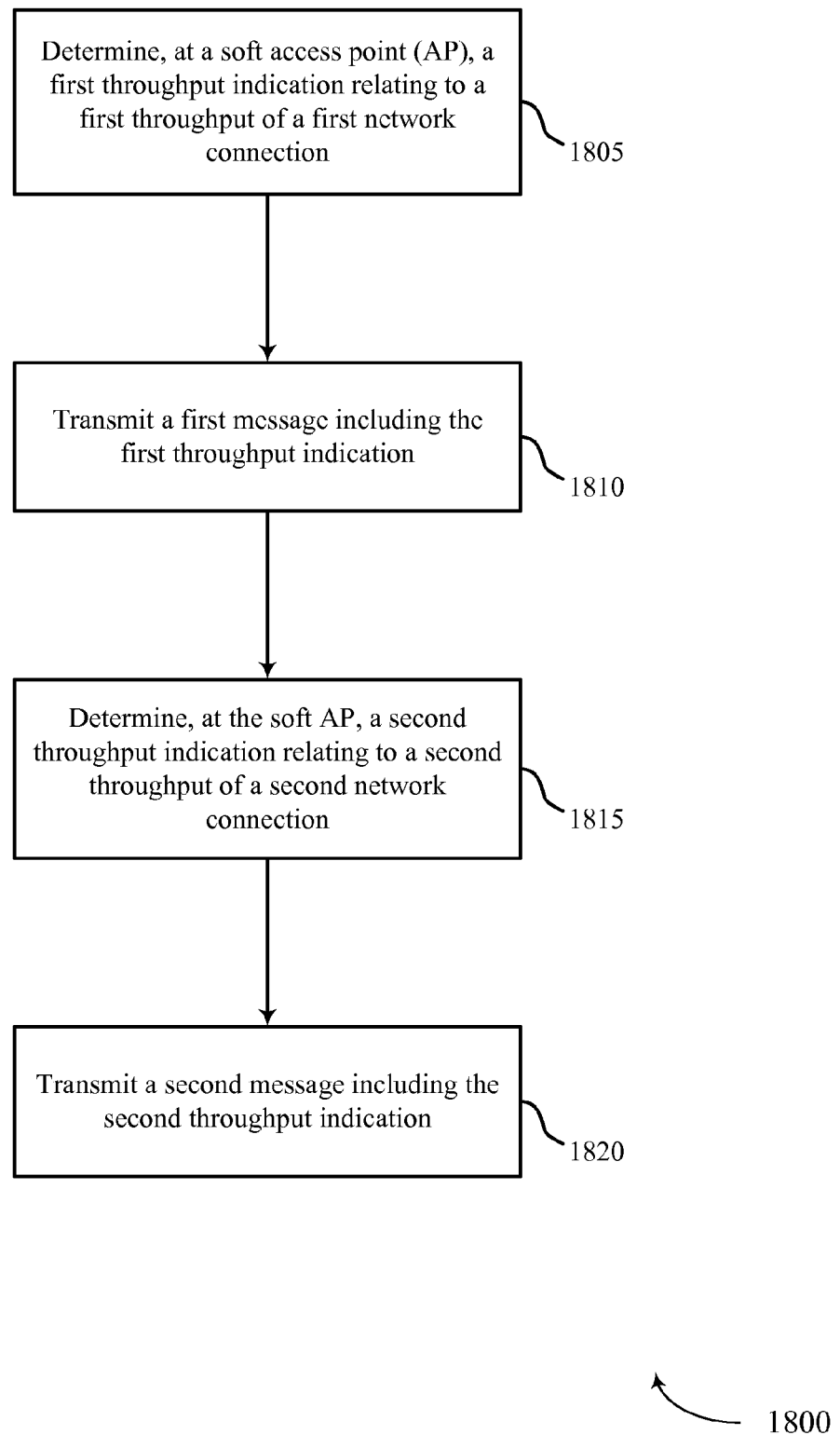

FIG. 18 shows a flowchart illustrating a method 1800 for soft AP backend data connection speed within a Wi-Fi beacon in accordance with various aspects of the present disclosure. The operations of method 1800 may be implemented by a soft AP 105 or its components as described with reference to FIGS. 1-12. For example, the operations of method 1800 may be performed by the AP connection speed determiner 910 as described with reference to FIGS. 9-12. In some examples, a soft AP 105 may execute a set of codes to control the functional elements of the AP 105 to perform the functions described below. Additionally or alternatively, the soft AP 105 may perform aspects the functions described below using special-purpose hardware. The method 1800 may also incorporate aspects of methods 1300, 1400, 1500, 1600, and 1700 of FIGS. 13-17.

At block 1805, the soft AP 105 may determine a first throughput indication relating to a first throughput of a first network connection as described with reference to FIGS. 2A-4. In certain examples, the operations of block 1805 may be performed by the throughput determiner 1005 as described with reference to FIG. 10.

At block 1810, the soft AP 105 may transmit a first message comprising the first throughput indication as described with reference to FIGS. 2A-4. In certain examples, the operations of block 1810 may be performed by the AP throughput transceiver 1010 as described with reference to FIG. 10.

At block 1815, the soft AP 105 may determine a second throughput indication relating to a second throughput of a second network connection as described with reference to FIGS. 2A-4. In certain examples, the operations of block 1815 may be performed by the throughput determiner 1005 as described with reference to FIG. 10.

At block 1820, the soft AP 105 may transmit a second message comprising the second throughput indication as described with reference to FIGS. 2A-4. In certain examples, the operations of block 1820 may be performed by the throughput transceiver 610 as described with reference to FIG. 6.

Thus, methods 1300, 1400, 1500, 1600, 1700, and 1800 may provide for soft AP backend data connection speed within a Wi-Fi beacon. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, at least one microprocessor in conjunction with a DSP core, or any other such configuration).

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of wireless communication, comprising:
determining, by a station (STA), a signal strength for communications with a number of access points (APs), wherein the number of APs comprises a soft AP;
receiving a backend data network throughput indication from each of the number of APs, the respective backend data network throughput indication of the soft AP including network technology information associated with a backend data network connection;
receiving an updated backend data network throughput indication from the soft AP, the updated backend data network throughput indication being responsive to a change in location of the soft AP; and
selecting an AP from the number of APs based at least in part on the signal strength and the backend data network throughput indication corresponding to the AP.

2. The method of claim 1, further comprising:
establishing a connection for communication with the selected AP.

3. The method of claim 1, wherein receiving the backend data network throughput indication comprises:
receiving a beacon from each of the number of APs, wherein the respective beacon of the soft AP comprises the respective backend data network throughput indication of the soft AP.

4. The method of claim 1, wherein receiving the backend data network throughput indication comprises:
transmitting a probe request to the number of APs; and
receiving a probe response from each of the number of APs, wherein the respective probe response of the soft AP comprises the respective backend data network throughput indication of the soft AP.

5. The method of claim 1, wherein selecting the AP from the number of APs comprises:
displaying connection information relating to one or more APs of the number of APs, wherein the connection information comprises the signal strength and the backend data network throughput indication for each of the one or more APs; and
receiving user input indicating a selection of a selected AP from the one or more APs.

6. The method of claim 1, further comprising:
selecting the soft AP from the number of APs based at least in part on the updated backend data network throughput indication and the signal strength.

7. The method of claim 1, wherein the network technology information comprises information associated with at least one of a 2G wireless communication network, a 3G wireless communication network, a Long Term Evolution (LTE) wireless communication network, or an LTE-A wireless communication network, and wherein the respective backend data network throughput indication of the soft AP further includes communication capability information associated with the backend data network connection.

8. A method of wireless communication, comprising:
determining, by a soft access point (AP), a first backend data network throughput indication relating to a first throughput and a first network technology associated with a first backend data network connection;
transmitting, by the soft AP, a first message comprising the first backend data network throughput indication including information corresponding to the first network technology; and
transmitting, by the soft AR a message comprising an updated backend data network throughput indication, the updated backend data network throughput indication being responsive to a change in location of the soft AP.

9. The method of claim 8, wherein transmitting the first message comprises:
broadcasting the first message comprising the first backend data network throughput indication.

10. The method of claim 8, wherein transmitting the first message comprises:
receiving a probe request from a station (STA); and
transmitting the first message comprising the first backend data network throughput indication to the STA, wherein the first message is responsive to the probe request.

11. The method of claim 8, wherein determining the first backend data network throughput indication comprises:
identifying network information relating to the first backend data network connection; and
determining the first network technology relating to the first backend data network throughput indication based at least in part on the network information.

12. The method of claim 11, wherein identifying network information comprises:
transmitting a network request to a modem of the soft AP; and
receiving, from the modem of the soft AP, the network information, wherein the network information is responsive to the network request.

13. The method of claim 11, wherein identifying network information comprises:
receiving, at a modem of the soft AP, a network request; and
transmitting, from the modem of the soft AP, the network information, wherein the network information is responsive to the network request.

14. The method of claim 8, further comprising:
determining, at the soft AP, a second backend data network throughput indication relating to a second throughput of a second backend data network connection.

15. The method of claim 14, further comprising:
identifying a network transition from the first backend data network connection to the second backend data network connection.

16. The method of claim 14, further comprising:
transmitting a second message comprising the second backend data network throughput indication.

17. The method of claim 8, wherein the first network technology comprises at least one of a 2G wireless communication network, a 3G wireless communication network, a Long Term Evolution (LTE) wireless communication network, or an LTE-A wireless communication network, and wherein the first backend data network throughput indication further includes information corresponding to a communication capability.

18. An apparatus associated with a station (STA) for wireless communication, the apparatus comprising:
a signal strength determiner to determine, at the STA, a signal strength for communications with a number of access points (APs), wherein the number of APs comprises a soft AP;

a throughput transceiver to receive a backend data network throughput indication from each of the number of APs, the respective backend data network throughput indication of the soft AP including network technology information associated with a backend data network connection;

the throughput transceiver to receive an updated backend data network throughput indication from the soft AR the updated backend data network throughput indication being responsive to a change in location of the soft AP; and an access point selector to select an AP from the number of APs based at least in part on the signal strength and the backend data network throughput indication corresponding to the AP.

19. The apparatus of claim 18, further comprising:
a connection establisher to establish a connection for communication with the selected AP.

20. The apparatus of claim 18, wherein the throughput transceiver to receive the backend data network throughput indication is further to:
receive a beacon from the number of APs, wherein the beacon comprises the backend data network throughput indication.

21. The apparatus of claim 18, wherein the throughput transceiver to receive the backend data network throughput indication is further to:
transmit a probe request to the number of APs; and
receive a probe response from the number of APs, wherein the probe response comprises the backend data network throughput indication.

22. The apparatus of claim 18, wherein the access point selector to select the AP from the number of APs is further to:
display connection information relating to a plurality of the number of APs, wherein the connection information comprises the signal strength and the backend data network throughput indication; and
the apparatus further comprising a user input facilitator to receive user input indicating a selection of the AP from the number of APs.

23. The apparatus of claim 18, wherein the network technology information comprises information associated with at least one of a 2G wireless communication network, a 3G wireless communication network, a Long Term Evolution (LTE) wireless communication network, or an LTE-A wireless communication network, and wherein the respective backend data network throughput indication of the soft AP further includes communication capability information associated with the backend data network connection.

24. An apparatus associated with a soft access point (AP) for wireless communication, the apparatus comprising:
a throughput determiner to determine, at the soft AP, a first backend data network throughput indication relating to a first throughput and a first network technology associated with a first backend data network connection;

an AP throughput transceiver to transmit a first message comprising the first backend data network throughput indication including information corresponding to the first network technology; and the AP throughput transceiver to transmit a message comprising an updated backend data network throughput indication, the updated backend data network throughput indication being responsive to a change in location of the soft AP.

25. The apparatus of claim 24, wherein the AP throughput transceiver to transmit the first message is further to:
broadcast the first message comprising the first backend data network throughput indication.

26. The apparatus of claim 24, wherein the AP throughput transceiver to transmit the first message is further to:
receive a probe request from a station (STA); and
transmit the first message comprising the first backend data network throughput indication to the STA, wherein the first message is responsive to the probe request.

27. The apparatus of claim 24, wherein the throughput determiner to determine the first backend data network throughput indication is further to:
identify network information relating to the first backend data network connection; and
determine the first network technology relating to the first backend data network throughput indication based at least in part on the network information.

28. The apparatus of claim 27, wherein the throughput determiner to identify network information is further to:
transmit a network request to a modem of the soft AP; and
the apparatus further comprising a network determiner to receive, from the modem of the soft AP, the network information, wherein the network information is responsive to the network request.

29. The apparatus of claim 24, further comprising:
the throughput determiner to determine, at the soft AP, a second backend data network throughput indication relating to a second throughput of a second backend data network connection.

30. The apparatus of claim 29, further comprising:
a network determiner to identify a network transition from the first backend data network connection to the second backend data network connection.

31. The apparatus of claim 29, further comprising:
the AP throughput transceiver to transmit a second message comprising the second backend data network throughput indication.

32. The apparatus of claim 24, wherein the first network technology comprises at least one of a 2G wireless communication network, a 3G wireless communication network, a Long Term Evolution (LTE) wireless communication network, or an LTE-A wireless communication network, and wherein the first backend data network throughput indication further includes information corresponding to a communication capability.

* * * * *